US010849134B2

(12) United States Patent
Islam et al.

(10) Patent No.: US 10,849,134 B2
(45) Date of Patent: Nov. 24, 2020

(54) INDICATING A RANGE OF BEAM CORRESPONDENCE IN A WIRELESS NODE

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US); Juergen Cezanne, Ocean Township, NJ (US); Navid Abedini, Raritan, NJ (US); Bilal Sadiq, Basking Ridge, NJ (US); Tao Luo, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/664,499

(22) Filed: Jul. 31, 2017

(65) Prior Publication Data

US 2018/0132252 A1 May 10, 2018

Related U.S. Application Data

(60) Provisional application No. 62/418,048, filed on Nov. 4, 2016.

(51) Int. Cl.
*H04W 72/08* (2009.01)
*H04B 7/06* (2006.01)
*H04W 72/04* (2009.01)
*H04W 16/28* (2009.01)
*H04W 36/06* (2009.01)
(Continued)

(52) U.S. Cl.
CPC ........ *H04W 72/085* (2013.01); *H04B 7/0617* (2013.01); *H04W 72/046* (2013.01); *H04W 72/048* (2013.01); *H04W 16/28* (2013.01); *H04W 36/06* (2013.01); *H04W 36/32* (2013.01); *H04W 52/0216* (2013.01); *Y02D 30/70* (2020.08)

(58) Field of Classification Search
CPC ............. H04W 72/085; H04W 72/046; H04W 72/048; H04W 36/32; H04W 52/0216; H04W 16/28; H04B 7/0617
See application file for complete search history.

(56) References Cited

U.S. PATENT DOCUMENTS

| 10,132,933 B2 | 11/2018 | Nallampatti Ekambaram et al. |
| 10,267,924 B2 | 4/2019 | Ramanandan et al. |
| 10,371,530 B2 | 8/2019 | Ramanandan et al. |

(Continued)

OTHER PUBLICATIONS

Rehder J. et al., "Global Pose Estimation with Limited GPS and Long Range Visual Odometry," 2012 IEEE International Conference on Robotics and Automation, May 2012, 8 pages, Institute of Electrical and Electronics Engineers.

(Continued)

*Primary Examiner* — Jackie Zuniga Abad
(74) *Attorney, Agent, or Firm* — Holland & Hart LLP

(57) ABSTRACT

Techniques are described for wireless communication. One method includes exchanging one or more signals between a first wireless node and a second wireless node and determining, at the first wireless node and based at least in part on the one or more signals, a range of correspondence between at least one of a transmit beam of the first wireless node and a receive beam of the first wireless node.

29 Claims, 16 Drawing Sheets

(51) Int. Cl.
*H04W 36/32* (2009.01)
*H04W 52/02* (2009.01)

(56) References Cited

U.S. PATENT DOCUMENTS

| | | |
|---|---|---|
| 10,495,763 B2 | 12/2019 | Niesen et al. |
| 10,502,840 B2 | 12/2019 | Niesen et al. |
| 2007/0189181 A1 | 8/2007 | Kirk et al. |
| 2009/0263009 A1 | 10/2009 | Krishnaswamy et al. |
| 2011/0288756 A1 | 11/2011 | Chapman et al. |
| 2012/0164948 A1* | 6/2012 | Narasimha ........ H04W 72/1215 455/63.1 |
| 2012/0182182 A1 | 7/2012 | Riley et al. |
| 2013/0039345 A1* | 2/2013 | Kim .................... H04W 72/046 370/332 |
| 2013/0040684 A1 | 2/2013 | Yu et al. |
| 2013/0215844 A1 | 8/2013 | Seol et al. |
| 2014/0118189 A1 | 5/2014 | Gyorfi et al. |
| 2014/0185481 A1 | 7/2014 | Seol et al. |
| 2014/0323143 A1 | 10/2014 | Jung et al. |
| 2015/0219767 A1 | 8/2015 | Humphreys et al. |
| 2016/0140729 A1 | 5/2016 | Soatto et al. |
| 2016/0285583 A1 | 9/2016 | Kasher et al. |
| 2016/0305784 A1 | 10/2016 | Roumeliotis I et al. |
| 2016/0349379 A1 | 12/2016 | Lacaze et al. |
| 2017/0031032 A1 | 2/2017 | Garin et al. |
| 2017/0033951 A1 | 2/2017 | Zhang et al. |
| 2018/0074206 A1 | 3/2018 | Niesen et al. |
| 2018/0091207 A1* | 3/2018 | Kakishima ........... H04B 7/0413 |
| 2018/0188381 A1 | 7/2018 | Zhang et al. |
| 2018/0188382 A1 | 7/2018 | Jubin et al. |
| 2018/0188383 A1 | 7/2018 | Niesen et al. |
| 2019/0113629 A1 | 4/2019 | Kang et al. |
| 2020/0033127 A1 | 1/2020 | Tsujii et al. |
| 2020/0150280 A1 | 5/2020 | Lin et al. |

OTHER PUBLICATIONS

LG Electronics: "Discussion on Channel Reciprocity for NR MIMO", 3GPP TSG RAN WG1 Meeting #86bis, R1-1609255, Lisbon, Portugal, Oct. 10-14, 2016, pp. 1-4.

Qualcomm: "Effect of Calibration in Beam Gain and Beam Coherence Time", 3GPP TSG RAN WG1 Meeting #86b, R1-1610150, Lisbon, Portugal, Oct. 10-14, 2016, pp. 1-6.

Samsung: "Impact of Beam/Channel Reciprocity for NR", 3GPP TSG RAN WG1 #86 bis, R1-1609082, Lisbon, Portugal, Oct. 10-14, 2016, pp. 1-4.

ISA/EP, International Search Report and Written Opinion of the International Searching Authority, Int'l Application No. PCT/US2017/055248, dated Dec. 6, 2017, European Patent Office, Rijswijk, NL, 16 pgs.

Gunduzhan E., et al., "Wireless Emergency Alerts in Arbitrary Sized Target Areas: Mobile Location Aware Emergency Notification", MILCOM 2015—2015 IEEE Military Communications Conference, pp. 1606-1611, IEEE Conferences, 2015.

* cited by examiner

INDICATING A RANGE OF BEAM CORRESPONDENCE IN A WIRELESS NODE

CROSS REFERENCES

The present Application for Patent claims priority to U.S. Provisional Patent Application No. 62/418,048 by Islam, et al., entitled "Indicating A Level of Beam Reciprocity In A Wireless Node," filed Nov. 4, 2016, assigned to the assignee hereof.

BACKGROUND

The following relates generally to wireless communication and more specifically to determining and indicating a range of beam correspondence between wireless nodes.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication with multiple communication devices, otherwise known as user equipments (UEs). A base station may communicate with UEs on downlink (DL) channels (e.g., for transmissions from a base station to a UE) and uplink (UL) channels (e.g., for transmissions from a UE to a base station).

Wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communication between two wireless nodes, e.g., between a base station and a UE, may use beams or beamformed signals for transmission and/or reception. A base station may transmit beamformed signals on DL beams associated with the base station. A UE may receive a signal on one or more DL beams associated with the UE. The DL beam associated with the base station and the DL beam associated with the UE used for DL communication between the base station and the UE constitute a DL beam pair. Similarly, a UE may transmit beamformed signals on UL beams associated with the UE. A base station may receive a signal on one or more UL beams associated with the base station. The UL beam associated with the UE and the UL beam associated with the base station used for UL communication between the UE and the base station constitute an UL beam pair. In some instances, the DL beam pair and the UL beam pair may be the same (e.g., may represent the same beam pairs). In other instances, differences may exist between a DL beam pair and an UL beam pair.

SUMMARY

Some examples of wireless communication systems support determining and indicating a range of beam correspondence (e.g., a level of beam reciprocity) between wireless nodes. For example, a downlink (DL) transmission, via one or more beams, from a transmitting wireless node (e.g., evolved nodeB (eNB)) may be used to identify a corresponding DL reception beam for a receiving wireless node (e.g., user equipment (UE)). The DL transmission beam and DL reception beam may be identified as a beam pair for the wireless nodes (e.g., a DL beam pair). A level of correspondence may be determined for one or both of the wireless nodes.

For example, a level of correspondence may be determined between a DL transmission beam and an uplink (UL) reception beam of a first wireless node (e.g., a transmitting wireless node) when communicating with a second wireless node (e.g., a receiving wireless node). Similarly, a level of correspondence may be determined between a DL reception beam and an UL transmission beam of the second wireless node when communicating with the first wireless node. Once a wireless node determines a level of correspondence between a transmit and receive beam, these beams may be used to communicate with other wireless nodes. A level of correspondence may be indicated such that, for example, the DL beam training information (e.g., beam pair) may be used to identify a beam pair for UL communication.

A method of wireless communication is described. The method may include exchanging one or more signals between a first wireless node and a second wireless node and determining, at the first wireless node and based at least in part on the one or more signals, a range of correspondence between at least one of a transmit beam of the first wireless node and a receive beam of the first wireless node.

An apparatus for wireless communication is described. The apparatus may include means for exchanging one or more signals between a first wireless node and a second wireless node and means for determining, at the first wireless node and based at least in part on the one or more signals, a range of correspondence between at least one of a transmit beam of the first wireless node and a receive beam of the first wireless node.

Another apparatus for wireless communication is described. The apparatus may include a processor, memory in electronic communication with the processor, and instructions stored in the memory. The instructions may be operable to cause the processor to exchange one or more signals between a first wireless node and a second wireless node and determine, at the first wireless node and based at least in part on the one or more signals, a range of correspondence between at least one of a transmit beam of the first wireless node and a receive beam of the first wireless node.

A non-transitory computer readable medium for wireless communication is described. The non-transitory computer-readable medium may include instructions operable to cause a processor to exchange one or more signals between a first wireless node and a second wireless node and determine, at the first wireless node and based at least in part on the one or more signals, a range of correspondence between at least one of a transmit beam of the first wireless node and a receive beam of the first wireless node.

In some examples of the method, apparatus, and non-transitory computer-readable medium described above, the range of correspondence includes full correspondence, partial correspondence, or no correspondence. Some examples of the method, apparatus, and non-transitory computer-readable medium described above may further include processes, features, means, or instructions for determining a range of correspondence between a transmit beam of the second wireless node and a receive beam of the second wireless node.

In some examples of the method, apparatus, and non-transitory computer-readable medium described above, exchanging one or more signals between the first wireless node and the second wireless node includes receiving, from the second wireless node, a signal indicating a range of calibration values associated with a transmit path and a receive path of the second wireless node. Some examples of the method, apparatus, and non-transitory computer-readable medium described above may further include processes, features, means, or instructions for using the range of calibration values to determine a range of correspondence between a transmit beam of the second wireless node and a receive beam of the second wireless node.

In some examples of the method, apparatus, and non-transitory computer-readable medium described above, the range of calibration values includes at least one of a range of amplitude error of antenna weights, a range of phase error of antenna weights, or combinations thereof. In some examples of the method, apparatus, and non-transitory computer-readable medium described above, the range of calibration values includes at least a difference between amplitude error of antenna weights associated with the transmit path and the receive path, a difference between phase error of antenna weights associated with the transmit path and the receive path, or combinations thereof.

In some examples of the method, apparatus, and non-transitory computer-readable medium described above, exchanging one or more signals between the first wireless node and the second wireless node includes receiving, from the second wireless node, a signal indicating a downlink quality of a transmission on a downlink beam pair that includes the transmit beam of the first wireless node and a receive beam of the second wireless node. Some examples of the method, apparatus, and non-transitory computer-readable medium described above may further include processes, features, means, or instructions for determining, at the first wireless node, an uplink quality of a transmission on an uplink beam pair that includes a transmit beam of the second wireless node and the receive beam of the first wireless node.

In some examples of the method, apparatus, and non-transitory computer-readable medium described above, the first wireless node and the second wireless node may apply a similar beam shape for the transmit beam and the receive beam. In some examples of the method, apparatus, and non-transitory computer-readable medium described above, the similar beam shape indicates that the transmit beam and the receive beam use a same set of antenna elements, or beam widths, or point to a same direction, or a combination thereof. Some examples of the method, apparatus, and non-transitory computer-readable medium described above may further include processes, features, means, or instructions for using the downlink quality and the uplink quality to determine the range of correspondence between the transmit beam of the second wireless node and the receive beam of the second wireless node.

In some examples of the method, apparatus, and non-transitory computer-readable medium described above, receiving the signal indicating the downlink quality includes receiving an indication of at least one of a reference signal received power (RSRP), or a reference signal received quality (RSRQ), or a signal-to-noise ratio (SNR), or a signal-to-interference-plus-noise ratio (SINR), or a channel quality indicator (CQI), or a received signal strength indicator (RSSI), or a combination thereof of the transmission on the downlink beam pair. In some examples of the method, apparatus, and non-transitory computer-readable medium described above, determining the uplink quality includes determining at least one of an RSRP, or an RSRQ, or an SNR, or an SINR, or a CQI or an RSSI, or a combination thereof of the transmission on the uplink beam pair.

In some examples of the method, apparatus, and non-transitory computer-readable medium described above, the transmit beam of the first wireless node may be associated with a higher quality than other transmit beams of the first wireless node and the receive beam of the first wireless node may be associated with a higher quality than other receive beams of the first wireless node. In some examples of the method, apparatus, and non-transitory computer-readable medium described above, determining the range of correspondence includes determining a difference between indices of the transmit beam of the first wireless node and the receive beam of the first wireless node.

Some examples of the method, apparatus, and non-transitory computer-readable medium described above may further include processes, features, means, or instructions for determining an uncertainty region for beam mapping based on the determined difference. In some examples of the method, apparatus, and non-transitory computer-readable medium described above, the range of correspondence corresponds to a breadth of the uncertainty region. Some examples of the method, apparatus, and non-transitory computer-readable medium described above may further include processes, features, means, or instructions for determining a difference between indices of a receive beam of the second wireless node and a transmit beam of the second wireless node.

In some examples of the method, apparatus, and non-transitory computer-readable medium described above, exchanging one or more signals includes receiving, from the second wireless node, an indication of a range of correspondence between a transmit beam of the second wireless node and a receive beam of the second wireless node. In some examples of the method, apparatus, and non-transitory computer-readable medium described above, receiving the indication of the range of correspondence between the transmit beam of the second wireless node and the receive beam of the second wireless node includes receiving the indication in a physical broadcast channel (PBCH), an extended physical broadcast channel (ePBCH), a random access channel (RACH) message, a physical downlink control channel (PDCCH), a physical uplink control channel (PUCCH), a physical uplink shared channel (PUSCH), a radio resource control (RRC) message, a master information block (MIB), or a system information block (SIB).

In some examples of the method, apparatus, and non-transitory computer-readable medium described above, receiving the indication of the range of correspondence between the transmit beam of the second wireless node and the receive beam of the second wireless node includes receiving the indication as part of a handover procedure. In some examples of the method, apparatus, and non-transitory computer-readable medium described above, the handover procedure is either a backward handover procedure or a forward handover procedure.

Some examples of the method, apparatus, and non-transitory computer-readable medium described above may further include processes, features, means, or instructions for determining a range of a beam sweep to be performed based at least in part on the range of correspondence and on a triggering event. In some examples of the method, apparatus, and non-transitory computer-readable medium described above, a range of a beam sweep to be performed for each of multiple simultaneous communication links may be different.

In some examples of the method, apparatus, and non-transitory computer-readable medium described above, the triggering event includes awaking in connected mode from a discontinuous reception (DRX) cycle whose duration exceeds a threshold. In some examples of the method, apparatus, and non-transitory computer-readable medium described above, the triggering event includes a changing of a transmission or reception subarray. In some examples of the method, apparatus, and non-transitory computer-readable medium described above, the triggering event includes identifying that a temperature of either the first wireless node or the second wireless node has changed in excess of a threshold.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
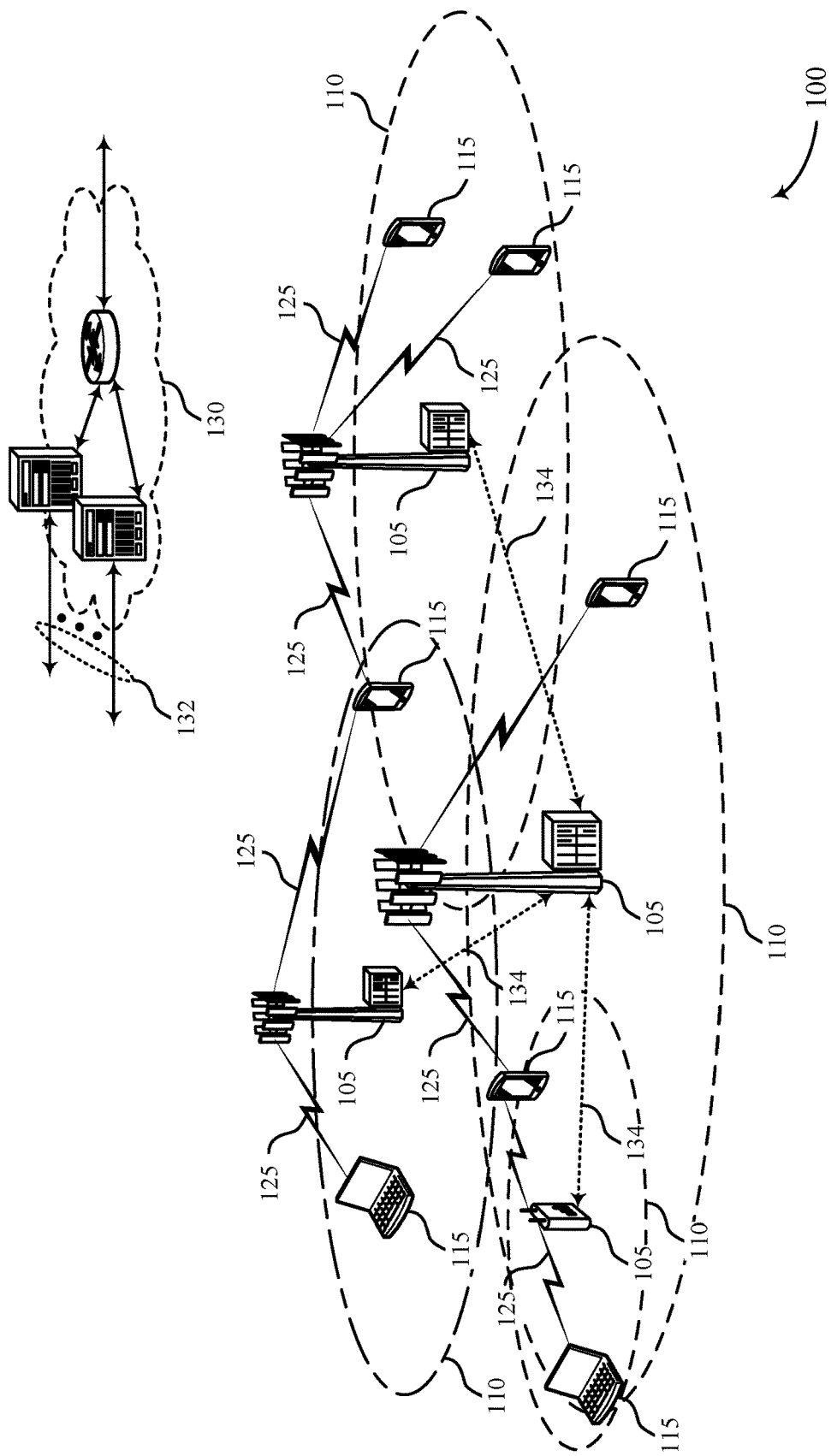
FIG. 1 illustrates a block diagram of a wireless communication system that supports determining and indicating a range of beam correspondence in accordance with various aspects of the present disclosure.

Some examples of wireless communication systems support both determining and indicating a range of beam correspondence (e.g., a level of a range of beam reciprocity) between wireless nodes. A downlink (DL) transmission, via one or more beams, from a transmitting wireless node (e.g., evolved nodeB (eNB)) may be used to identify a corresponding DL reception beam for a receiving wireless node (e.g., user equipment (UE)). The DL transmission beam and DL reception beam may be identified as a beam pair for the wireless nodes. Additionally, if a level of beam correspondence exists, the DL beam training information (e.g., beam pair) may be used to identify a beam pair for uplink (UL). Alternatively or additionally, an UL transmission, via one or more beams, from a transmitting wireless node (e.g., UE) may be used to identify an UL reception beam for a receiving wireless node (e.g., eNB).

In some cases, if a level of beam correspondence between wireless nodes exists, the wireless nodes may avoid performing a beam sweep to identify a beam pair (i.e., transmission beam and reception beam). However, in some examples, the level of beam correspondence may be below a threshold and a wireless node may perform at least a partial beam sweep (e.g., of a plurality of beams, a subset of the plurality of beams, etc.) to identify a beam pair (i.e., a transmission/reception beam) for the wireless nodes. In some examples, a level of correspondence may exist for UL and DL beams at a single node, and these beams may be utilized for communications with other wireless nodes.

Determining the level of beam correspondence between wireless nodes, in some examples, may be based on one or more conditions. In one case, a condition for beam correspondence may include that a first wireless node (e.g., eNB) determines a receiving beam for an UL reception based on a second wireless device (e.g., UE) DL measurement for one or more transmitted beams from the first wireless node. Additionally or alternatively, in some cases, a condition may include that the first wireless node (e.g., eNB) determines a transmitted beam for a DL transmission based on an UL measurement associated with the transmission of one or more beams from the second wireless node. In some cases, a wireless node (e.g., UE) may additionally determine a transmission beam for an UL transmission based on measuring one or more received beams associated with a DL transmission from a different wireless node (e.g., eNB). Additionally or alternatively, a wireless node may determine a reception beam for a DL based on an indication in the DL transmission beam identifying a base beam. As a result, the wireless node may determine a DL reception beam based on the indication.

Aspects of the disclosure introduced above are described below in the context of a wireless communication system. Various examples of signaling exchanges used for determining a receive beam and transmit beam for one or more wireless nodes, and the like are then described. Aspects of the disclosure are further illustrated by and described with reference to apparatus diagrams, system diagrams, process flows, and flowcharts that relate to determining and indicating a range of beam correspondence (e.g., a level of a range of beam reciprocity) between wireless nodes.

FIG. 1 illustrates a block diagram of a wireless communication system 100 that supports determining and indicating a range of beam correspondence in accordance with various aspects of the present disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNB, Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is an LTE/LTE-A network. In LTE/LTE-A networks, the term evolved Node B (eNB) may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on the context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell may also cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communication at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include UL transmissions from a UE 115 to a base station 105, and/or DL transmissions, from a base station 105 to a UE 115. The DL transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communication using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

In some examples UE 115 may support discontinuous reception (DRX) operation—the periodic switching off of a receiver, usually to save energy. In some examples, DRX cycles can be configured in the DL so that the UE does not have to decode the Physical Downlink Control Channel (PDCCH) or receive Physical Downlink Shared Channel (PDSCH) transmissions in certain subframes. In some cases, a UE 115 may monitor a wireless link 125 continuously for an indication that the UE 115 may receive data. In other cases (e.g., to conserve power and extend battery life) a UE 115 may be configured with a DRX cycle. A DRX cycle consists of an On Duration when the UE 115 may monitor for control information (e.g., on PDCCH) and a DRX period when the UE 115 may power down radio components. In some cases, a UE 115 may be configured with a short DRX cycle and a long DRX cycle.

In some cases, a UE 115 may enter a long DRX cycle if it is inactive for one or more short DRX cycles. The transition between the short DRX cycle, the long DRX cycle, and continuous reception may be controlled by an internal timer or by messaging from a base station 105. A UE 115 may receive scheduling messages on PDCCH during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

In some examples, base station 105 or UE 115 may communicate one or more messages via a physical broadcast channel (PBCH), the LTE physical channel which carries the Master Information Block (MIB), consisting of a limited number of the most frequently transmitted parameters essential for initial access to the cell. The PBCH is designed for early detection by the UE and cell-wide coverage.

In some examples, base station 105 or UE 115 may communicate one or more messages via RRC. The RRC protocol handles the Layer 3 control plane signaling by which the E-UTRAN controls the UE behavior. The RRC protocol supports the transfer of both common and dedicated Non-Access Stratum information. It covers a number of functional areas including System Information (SI) broadcasting, connection control including handover within LTE, network-controlled inter-Radio Access Technology (radio access technology (RAT)) mobility, and measurement configuration and reporting.

In some examples, base station 105 or UE 115 may communicate one or more messages via a random access channel (RACH). In some cases, a RACH may be a transport channel used for access to the network when the UE does not have accurate UL timing synchronization, or when the UE does not have any allocated UL transmission resources. The RACH is normally contention-based, which may result in collisions between UEs. After the UE 115 decodes a SIB, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit an RRC connection request, or RACH message 3, along with a temporary mobile subscriber identity (TMSI) (if the UE 115 has previously been connected to the same wireless network) or a random identifier.

The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Wireless communication system 100 may operate in an ultra-high frequency (UHF) region using frequency bands from 700 MHz to 2600 MHz (2.6 GHz), although in some cases wireless local area network (WLAN) networks may use frequencies as high as 4 GHz. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Specifically, wireless communication system 100 may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device, such as a UE 115, may select a beam direction for communicating with a network by selecting the strongest beam from among a number of signals transmitted by a base station 105. In one example, the signals may be DL signals transmitted from the base station 105 during discovery. The discovery procedure may be cell-specific, e.g., may be directed in incremental directions around the geographic coverage area 110 of the base station 105. The discovery procedure may be used, at least in certain aspects, to identify and select beam(s) to be used for beamformed transmissions between the base station 105 and a UE 115.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communication with a UE 115.

Wireless communication system 100 may be or include a multicarrier mmW wireless communication system. Broadly, aspects of wireless communication system 100 may include a UE 115 and a base station 105 configured to support a range of beam correspondence (e.g., a level of beam reciprocity). For example, the base station 105 and/or UE 115 may exchange one or more signals. In some cases, base station 105 or UE 115 may determine, based on the one or more signals, a level of correspondence between at least one of a transmit beam and a receive beam. A DL transmission, via one or more beams, from base station 105 may be used to identify a DL reception beam for UE 115. Similarly, an UL transmission, via one or more beams, from UE 115 may be used to identify an UL reception beam for base station 105.

In some cases, if a level of beam correspondence between base station 105 and UE 115 exists, base station 105 and UE 115 may avoid performing a beam sweep to identify a beam pair (i.e., transmission beam and reception beam). However, in some examples, the level of beam correspondence may be below a threshold and base station 105 or UE 115 may perform at least a partial beam sweep (e.g., of a plurality of beams, a subset of the plurality of beams, etc.) to identify a beam pair (i.e., a transmission/reception beam) for the wireless nodes. In some examples, a level of correspondence may exist for UL and DL beams at base station 105 or UE 115, and the UL and DL beams may be utilized for communications with other base stations 105 or UEs 115.

Figure 2:
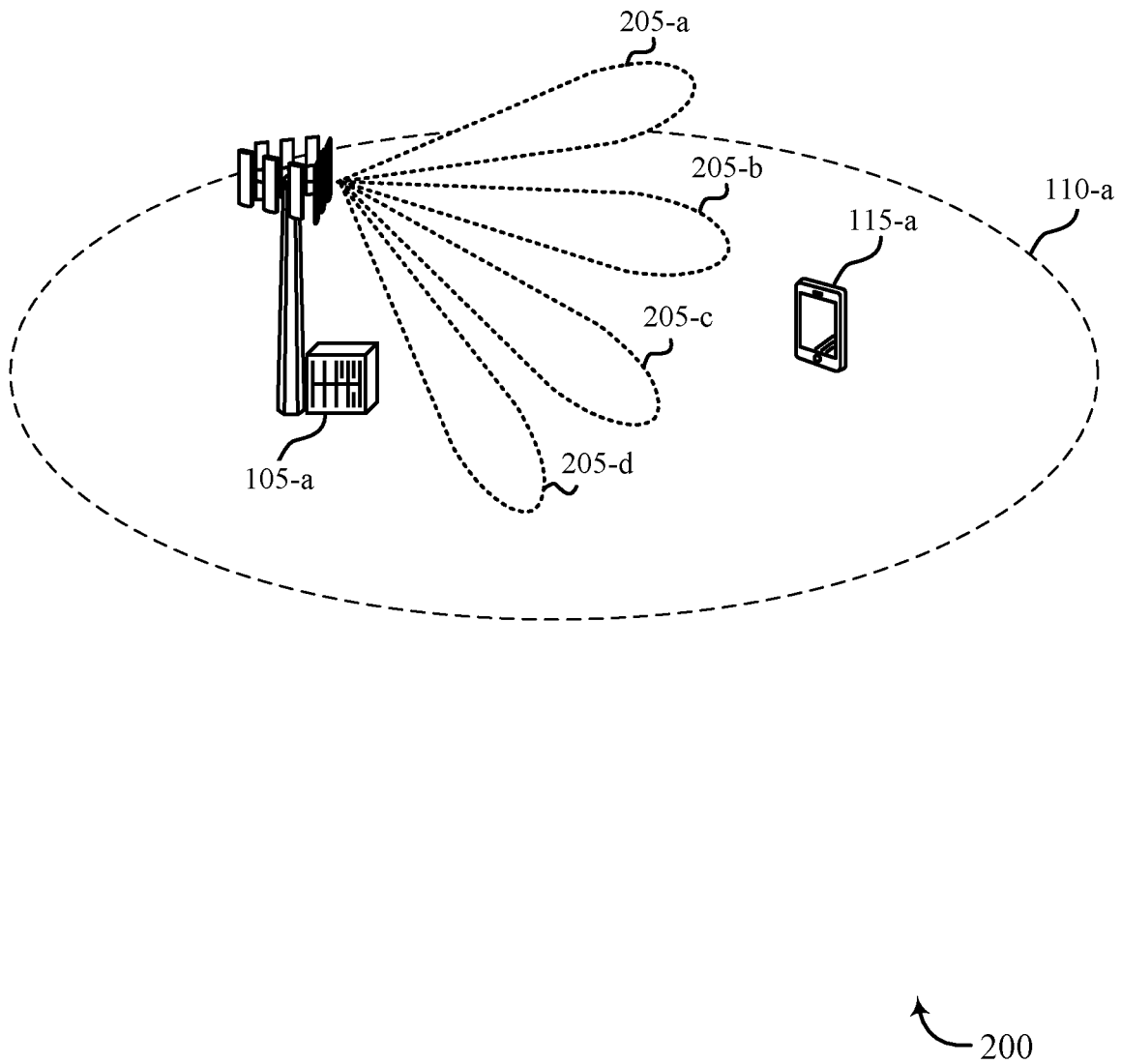
FIG. 2 illustrates an example of a wireless communication system that supports determining and indicating a range of beam correspondence, in accordance with various aspects of the present disclosure.

FIG. 2 illustrates an example of a wireless communication system 200 that supports determining and indicating a range of beam correspondence, in accordance with various aspects of the present disclosure. Wireless communication system 200 may be an example of one or more aspects of wireless communication system 100 of FIG. 1. Some examples of wireless communication system 200 may be a mmW wireless communication system. Wireless communication system 200 may include UE 115-$a$ and base station 105-$a$, which may be one or more aspects of UE 115 and base station 105 as described with reference to FIG. 1. The described techniques of wireless communication system 200 supports determining a level of beam correspondence between UE 115-$a$ and base station 105-$a$.

In some examples, wireless communication system 200 may determine a range of beam correspondence (e.g., a level of beam reciprocity) based on one or more transmissions of signals between base station 105-$a$ and UE 115-$a$. The determined range of correspondence may be one of more than two (2) levels of beam correspondence. For example, the range of beam correspondence may include full correspondence, partial correspondence, or no correspondence. In some cases of wireless communication system 200, base station 105-$a$, or UE 115-$a$, or both may perform beam training based on received signals from the transmitting device (e.g., base station 105-$a$ or UE 115-$a$). Base station 105-$a$ may be a mmW base station that may transmit a beamformed transmission on an active (base) beam to UE 115-$a$. A transmission from base station 105-$a$ may be a beamformed or directional transmission directed towards UE 115-$a$. For example, base station 105-$a$ may transmit signals to UE 115-$a$ on DL transmission beams 205-$a$ through 205-$d$.

Base station 105-$a$ may transmit DL signals in a beamformed manner and sweep through the angular coverage region for a geographic coverage area 110-$a$. Each of DL transmission beams 205-$a$ through 205-$d$ may be transmitted in a beam sweeping operation in different directions so as to cover the coverage area of base station 105-$a$. For example, DL transmission beam 205-$a$ may be transmitted in a first direction, DL transmission beam 205-$b$ may be transmitted in a second direction, DL transmission beam 205-$c$ may be transmitted in a third direction, and DL transmission beam 205-$d$ may be transmitted in a fourth direction. Although wireless communication system 200 illustrates four DL transmission beams, i.e., DL transmission beams 205-$a$ through 205-$d$, it is to be understood that fewer or more DL transmission beams may be transmitted.

The DL transmission beams 205 may additionally be transmitted at variable beam widths, at different elevation angles, etc. In some examples, DL transmission beams 205-$a$ through 205-$d$ may be associated with a beam index, e.g., an indicator identifying the DL transmission beam. UE 115-$a$ may, in some examples, identify a DL reception beam based on the beam index received and associated with the DL transmission beam (e.g., DL transmission beam 205-$b$). In some examples, base station 105-$a$ may determine an UL reception beam based on one or more received UL signals received from UE 115-$a$.

Base station 105-$a$ may, additionally or alternatively, transmit DL transmission beams 205-$a$ through 205-$d$ during different symbol periods of a subframe. For example, base station 105-$a$ may transmit DL transmission beam 205-$a$ during a first symbol period (e.g., symbol 0), DL transmission beam 205-$b$ during a second symbol period (e.g., symbol 1), DL transmission beam 205-$c$ during a third symbol period (e.g., symbol 2), and DL transmission beam 205-$d$ during a fourth symbol period (e.g., symbol 3). In some cases, base station 105-$a$ may also transmit DL transmission beams 205-$a$ through 205-$d$ during other symbol periods of a subframe. In some cases, UE 115-$a$ may identify a DL reception beam based on the symbol period of the subframe associated with the received DL transmission beam (e.g., DL transmission beam 205-$b$). UE 115-$a$ may also transmit a report to base station 105-$a$ indicating to base station 105-$a$ the DL reception beam for UE 115-$a$.

In some cases, base station 105-$a$ may perform beam sweeping to determine a location and direction of UE 115-$a$. The beam sweeping operation may improve communication between base station 105-$a$ and UE 115-$a$ when a level of correspondence does not hold between DL or UL channels. After base station 105-$a$ performs beam sweeping (e.g., transmitting one or more signals via DL transmission beams 205-$a$ through 205-$d$), base station 105-$a$ may receive a response signal from UE 115-$a$. A response signal may include calibration values for calibrating a transmit path and receive path for UE 115-$a$. In one case, UE 115-$a$ may determine a level of correspondence for an UL transmission beam or DL reception beam using the calibration values.

Additionally, the range of calibration values may include at least one of a range of amplitude error of antenna weights, a range of phase error of the antenna weights, or combinations thereof. In some cases, the range of calibration values may include at least a difference between amplitude error of antenna weights associated with the transmit path and the receive path, a difference between phase error of antenna weights associated with the transmit path and the receive path, or combinations thereof. Base station 105-$a$ or UE 115-$a$, in some cases, may determine an uncertainty for beam mapping based on a difference between amplitude error of antenna weights and phase error of antenna weights.

In some examples of wireless communication system 200, base station 105-a and UE 115-a may include one or more antenna arrays. An antenna array may include one or more antenna elements. A DL transmission beam may be transmitted from base station 105-a to UE 115-a. Subsequent to the DL transmission, one or more antenna elements of UE 115-a may receive the DL transmission beam. Alternatively or additionally, an UL transmission beam may be transmitted from UE 115-a to base station 105-a. As a result, one or more antenna elements of base station 105-a may receive the UL transmission beam. In some examples, base station 105-a and/or UE 115-a may determine a level of beam non-correspondence. Determining a level of beam non-correspondence may include base station 105-a and UE 115-a computing calibration values. In some examples, computing calibration values may include calculating amplitude and phase error of transmit and receive signals (e.g., beams). For example, base station 105-a or UE 115-a may compute an array weight vector associated with an incoming signal (e.g., transmission beam). Base station 105-a or UE 115-a may compute a channel response based on the following equation:

$$h = 1 e^{-jkd(\sin\theta)} \ldots e^{-j(N-1)kd(\sin\theta)} \quad (1)$$

where k is the wavenumber of the incoming signal (i.e., transmission beam), N is the number of antenna elements of the antenna array, d is the spacing between the antenna elements of the antenna array, and θ is the angle of the incoming signal.

A transmit path associated with DL and UL signals in wireless communication system 200 may be subject to amplitude and phase error. Base station 105-a or UE 115-a may compute an array weight vector associated with amplitude and phase error of an incoming signal (e.g., transmission beam) based on the following equation:

$$w_{ideal} = \alpha_{0,tx} e^{j\delta_{0,tx}} \alpha_{1,tx} e^{-jkd(\sin\theta)+\delta_{1,tx}} \ldots \alpha_{N-1,tx} e^{-j(N-1)kd(\sin\theta)+\delta_{(N-1),tx}} \quad (2)$$

where $\alpha_{0,tx}$ is the amplitude error that may be a value within a range (e.g., 0.9 to 1.1), k is the wavenumber of the incoming signal (i.e., transmission beam), N is the number of antenna elements of the antenna array, d is the spacing between the antenna elements of an antenna array, and θ is the angle of the incoming signal.

Additionally, $\delta_{0,tx}$ is the phase error term. In some cases, each antenna element of an antenna array may have different phase error terms. For example, a first phase error term may be related to a first antenna element and may have a first value, while a second phase error term may relate to a second antenna element and may include a second value different from the first value.

Additionally, in some cases, a receive path of DL and UL signals in wireless communication system 200 may be subject to amplitude and phase error. Base station 105-a or UE 115-a may compute an array weight vector associated with amplitude and phase error for a receive path signal based on the following equation:

$$w = \alpha_{0,rx} e^{j\delta_{0,rx}} \alpha_{1,rx} e^{-jkd(\sin\theta)+\delta_{1,rx}} \ldots \alpha_{N-1,rx} e^{-j(N-1)kd(\sin\theta)+\delta_{(N-1),rx}} \quad (3)$$

where $\alpha_{0,rx}$ is the amplitude error and may be a value within a range of values, k is the wavenumber of the incoming signal, N is the number of antenna elements of the antenna array, d is the spacing between the antenna elements of the antenna array, and θ is the angle of the incoming signal. Additionally, $\delta_{0,rx}$ is the phase error term at antenna elements 0, 1 . . . N–1.

Phase error may, in some cases, shift a direction of one or more beams associated with base station 105-a or UE 115-a. Base station 105-a or UE 115-a may compute an array weight vector associated with phase distortion and angular shift for a transmit or receive path signal based on the following equation:

$$w_{dist,\mu} = \frac{e^{j\delta_0} e^{-jkd(\sin\theta+\mu)+\delta_1} \ldots e^{-j(N-1)kd(\sin\theta+\mu)+\delta_{(N-1)}}}{\sqrt{N}} \quad (4)$$

The phase error, in some examples, may be assumed to be uniformly distributed in a range. The range may be identified by a number of bits in a phase quantizer. For example, for a B bit phase quantizer, a phase error may be a range uniformly between $-\pi/2^B$ to $+\pi/2^B$. The term denotes the angular shift for a corresponding beam (e.g., transmission beam or reception beam). In some examples, when μ is equal to zero, base station 105-a or UE 115-a may align a beam toward an angle of arrival at one or more of the antenna elements 0, 1 . . . N–1. Additionally or alternatively, when μ is equal to a number other than zero, base station 105-a or UE 115-a may align a beam by shifting the beam to the left or right relative to the angle of arrival axis. In some examples, base station 105-a or UE 115-a may be restricted from shifting a beam towards an angle of arrival, even when the angular shift term μ is equal to zero, based on the presence of random phase error. As a result, there may be an absence of a level of beam correspondence for base station 105-a or UE 115-a.

Phase error may additionally affect neighboring beams associated with a base beam angled towards the angle of arrival. In some examples, due to randomness of phase error, a neighboring beam (e.g., beam 205-a or beam 205-c) may have a greater array gain compared to the base beam (e.g., beam 205-b). Some examples of wireless communication systems 200 may use a two-bit phase quantizer to mitigate an array gain of neighboring beams exceeding an array gain of the base beam, i.e., the beam intended to point to the angle of arrival. In some examples, if the phase error ranges between –45 degrees to +45 degrees, UE 115-a or base station 105-a may identify that a level of beam correspondence exists and beam training on the DL may be used to identify beam pairs in the UL.

Alternatively, some examples of wireless communication systems 200 may use a one-bit phase quantizer to mitigate an array gain of neighboring beams exceeding an array gain of the base beam, i.e., the beam intended to point to the angle of arrival. For a one-bit phase quantizer, the phase error may be distributed randomly and uniformly between a range of –90 degrees to +90 degrees. In the presence of a large phase error, a gain of an antenna array element associated with a neighboring beam of base station 105-a may less likely exceed the gain of the antenna array element of the base beam (e.g., base beam 205-b) that may point towards a direction of UE 115-a.

Additionally, in the presence of large phase error, base station 105-a or UE 115-a may perform a partial beam sweep in the UL based on determining the range of beam sweep based on information obtained from DL. Base station 105-a or UE 115-a may transmit a range of amplitude and phase error to each other, for example, in a header of a data packet. In some examples, base station 105-a may use a same beam to transmit a DL beam training signal and to receive an UL beam training signal from UE 115-a. Base station 105-a may compare the DL received signal strength of a DL transmit beam and the UL received signal strength of an UL receive beam to determine an existence or absence of beam correspondence.

In some cases, each antenna element of an antenna array may include different phase error terms. Additionally, wireless communication system 200 may determine a level of beam correspondence based on a ratio of the amplitude and phase error associated with a transmit path and a receive path. In some examples, a level of beam correspondence may exist based on the ratios of the amplitude and phase error of the transmit path and the receive path being within a threshold range of each other.

Additionally or alternatively, the received response signal from UE 115-a may be an indication to base station 105-a of a DL quality associated with the transmission of the DL beam used to transmit the DL signal to UE 115-a. In some examples, the indication may be a DL quality associated with a DL beam pair. For example, a DL beam pair may include a DL transmit beam (e.g., DL transmission beam 205-b) associated with base station 105-a and DL reception beam associated with UE 115-a. UE 115-a may determine a reference signal received power (RSRP) or reference signal received quality (RSRQ) for a DL transmission associated with a DL transmission beam. In some cases, base station 105-a may receive at least one of a RSRP, or a RSRQ, or a signal-to-noise ratio (SNR), or a signal-to-interference-plus-noise ratio (SINR), or a channel quality indication (CQI), or a received signal strength indicator (RSSI), or a combination thereof of the transmission on the DL beam pair.

Base station 105-a in some examples may determine an UL quality associated with an UL transmission beam from UE 115-a. In some examples, the UL quality may be based on a SNR or SINR of an UL beam pair. For example, an UL beam pair may include an UL transmit beam associated with UE 115-a and an UL reception beam associated with base station 105-a. Base station 105-a or UE 115-a may determine the SNR or SINR based on the UL transmit beam or UL receive beam. In some examples, base station 105-a or UE 115-a may determine a level of correspondence using the DL quality. Alternatively, base station 105-a or UE 115-a may determine the level of correspondence using the UL quality. In some cases, base station 105-a may transmit at a higher power level compared to UE 115-a. In some examples, a duration of an UL beam sweep may have a longer duration compared to a DL beam sweep. The duration of an UL beam sweep may be determined based on a link budget, i.e., a difference between transmit power between DL and UL.

Base station 105-a and UE 115-a may transmit messages using one or more physical channels or control channels. In one case, base station 105-a or UE 115-a may transmit an indication identifying a level of correspondence to each other via a PBCH. In some cases, base station 105-a or UE 115-a, may transmit an indication identifying a level of correspondence to each other via a RACH message. For example, base station 105-a or UE 115-a may transmit the indication via msg1-msg4 of the RACH. Alternatively, UE 115-a may transmit an indication identifying a level of correspondence to base station 105-a via a physical uplink control channel (PUCCH). Base station 105-a or UE 115-a, in some cases, may transmit an indication identifying a level of correspondence to each other via a RRC message.

In some examples, base station 105-a or UE 115-a may transmit an indication identifying a level of correspondence to each other via an extended physical broadcast channel (ePBCH). Alternatively, base station 105-a or UE 115-a may transmit an indication identifying a level of correspondence to each other via a physical uplink shared channel (PUSCH).

In some examples, base station 105-a or UE 115-a may select a frequency region and/or a waveform configuration for transmitting a random access signal (e.g., RACH message or msg1-msg4) based on an index of an identified DL signal of a DL transmission beam 205-a, 205-b, 205-c, or 205-d. During a random access period, base station 105-a may identify an UL transmission beam by receiving the random access signal in a sweeping manner. Base station 105-a may also identify the UE 115-a selected DL reception beam from the frequency resource and/or RACH waveform used (e.g., the used frequency region and/or waveform configuration) that includes the RACH message (e.g., msg1) of the random access signal.

In some examples, UE 115-a may receive one or more DL signals on one or more DL transmission beams 205-a through 205-d. The UE 115-a may identify a DL reception beam that satisfies a threshold, e.g., received signal strength threshold, channel/link quality threshold, etc. UE 115-a may identify a candidate DL reception beam based on a DL signal satisfying the threshold. As a result, UE 115-a may select a corresponding DL reception beam associated with the DL transmission beam. In some examples, UE 115-a may identify a frequency resource and/or RACH waveform to use for transmission of the RACH message based on the selected DL reception beam.

In one example, the frequency resource and/or RACH waveform used for the transmission of the RACH message may correspond to the symbol of the identified DL transmission beam. Alternatively, base station 105-a may identify a DL reception beam of UE 115-a from the used frequency region and/or RACH waveform that contains the message-1 of the random access signal. Base station 105-a may determine an UL reception beam by measuring a quality of the received signal at different UL receiver beams (e.g., DL beams 205-a through 205-d). The signal quality may denote one or more combinations of RSRP, or a RSSI, or a RSRQ, SNR, SINR, etc. In some examples, UE 115-a may select a DL reception beam and the frequency region of RACH and/or RACH waveform based on the index of the DL transmission beam. UE 115-a may select a DL reception beam that satisfies a transmit power condition.

In some examples, base station 105-a and UE 115-a may receive an indication identifying a level of correspondence between a DL transmission beam of base station 105-a and a DL reception beam of UE 115-a as part of a handover procedure. A handover procedure may be a forward handover operation between base station 105-a and UE 115-a. Alternatively, the handover procedure may be a backward handover operation between base station 105-a and UE 115-a.

Base station 105-a and UE 115-a may determine a range of beam sweep based on the level of correspondence or a triggering event, or a combination thereof. A triggering event may include a UE 115-a transitioning to a connected mode from a DRX cycle. In some examples, UE 115-a may transition to a connected mode from a DRX cycle whose duration exceeds a threshold duration. In some cases, the triggering event may include a configuration change of a transmission sub-array or a reception sub-array. Additionally or alternatively, the triggering event may include a temperature change of base station 105-a or UE 115-a. For example, a temperature of UE 115-a may exceed a predetermined threshold temperature. As a result, UE 115-a may modify a beam sweep range based on the temperature change. In some examples, the beam sweep range may be different for different links (e.g., DL or UL).

In the presence of complete random phase error, base station 105-*a* or UE 115-*a* may be precluded from attaining a full array gain. In such cases, wireless communication systems 200 may configure base station 105-*a* or UE 115-*a* to calibrate. In some examples, base station 105-*a* or UE 115-*a* may calibrate one or more receiver chain components associated with base station 105-*a* or UE 115-*a*. Calibrating one or more receiver chain components of base station 105-*a* or UE 115-*a* may be based on using an external component with base station 105-*a* or UE 115-*a*. For example, an external component (not shown) may generate an external reference signal of known amplitude and phase. The external reference signal may be transmitted to base station 105-*a* or UE 115-*a*. In some examples, the external component may monitor and perform receiver measurements to estimate a gain and a phase error associated with the signal. Alternatively, calibrating one or more receiver chain components of base station 105-*a* or UE 115-*a* may be based on using one or more hardware components, e.g., couplers at antenna ports to tap a portion of a transmit signal and inject back into a receive path of base station 105-*a* or UE 115-*a*. A reference signal generated in a transmit baseband may be looped back through the coupled path back to the receiver baseband to calibrate an overall transmit and receive chain.

Additionally or alternatively, calibrating one or more receiver chain components of base station 105-*a* or UE 115-*a* may be based on generating a reference signal using an existing transmit chain and measuring a received signal using one or more receive chains. For example, base station 105-*a* or UE 115-*a* may generate a reference signal using an existing transmit chain of base station 105-*a* or UE 115-*a* and measure a received signal using a receive chain of base station 105-*a* or UE 115-*a*.

UE 115-*a* or base station 105-*a* may perform self-calibration based on mutual coupling among antenna array elements. For example, antenna array elements may be used to measure a phase and/or amplitude difference between each other based on transmitting from an antenna array element and receiving at another antenna array element. For example, UE 115-*a* or base station 105-*a* may transmit a signal having a first phase from a first antenna array element. At a second antenna array element of UE 115-*a* or base station 105-*a*, UE 115-*a* or base station 105-*a* may measure and compute a difference of the received first phase at the second antenna array element. Additionally, UE 115-*a* or base station 105-*a* may transmit a second signal having a second phase from a third antenna array element and measure a difference of the second phase of the received second signal at the second antenna array element. UE 115-*a* or base station 105-*a* may align the first, second, and third antenna array element based on dynamically adjusting the second phase of the second signal until it matches the first phase of the first signal.

In some cases, UE 115-*a* or base station 105-*a* may simultaneously transmit with one antenna array element and receive at another antenna array element. The mutual coupling, in some examples, among the elements may be the same, and the mutual coupling amplitudes may be within a dynamic range.

In some cases, UE 115-*a* or base station 105-*a* may perform gain calibration based on generating a signal with high gain fidelity on a transmit chain. In some examples, UE 115-*a* may transmit at a high signal level based on UE 115-*a* being within a region where output power may be consistent across temperature and process variations. In some examples, base station 105-*a* may experience interference based on UE 115-*a* transmitting at a high signal level. UE 115-*a* may coordinate its calibration with base station 105-*a* to mitigate interference between UE 115-*a* and base station 105-*a*. For example, during calibration, UE 115-*a* may avoid beamforming in a direction towards base station 105-*a*.

UE 115-*a*, in some examples, may avoid beamforming in a direction towards base station 105-*a* based on one or more transmit antenna elements actively transmitting. Additionally or alternatively, UE 115-*a* may avoid beamforming in a direction towards base station 105-*a* to ensure a strength associated with coupling an adjacent receive chain satisfies a predetermined threshold. In some examples, transmitting a self-calibration transmission signal has the potential to cause interference over a wider spatial area in a vicinity of UE 115-*a*, requiring the need for coordination with base station 105-*a*. Base station 105-*a* may allow system-wise or cluster-wise resource blanking so that UE 115-*a* may self-calibrate. Base station 105-*a* may additionally determine the resource blanking based on an indication from UE 115-*a* indicating an absence of a level of beam correspondence. In some cases, UE 115-*a* may transmit resource grant requests to base station 105-*a* for self-calibrating.

Figure 3:
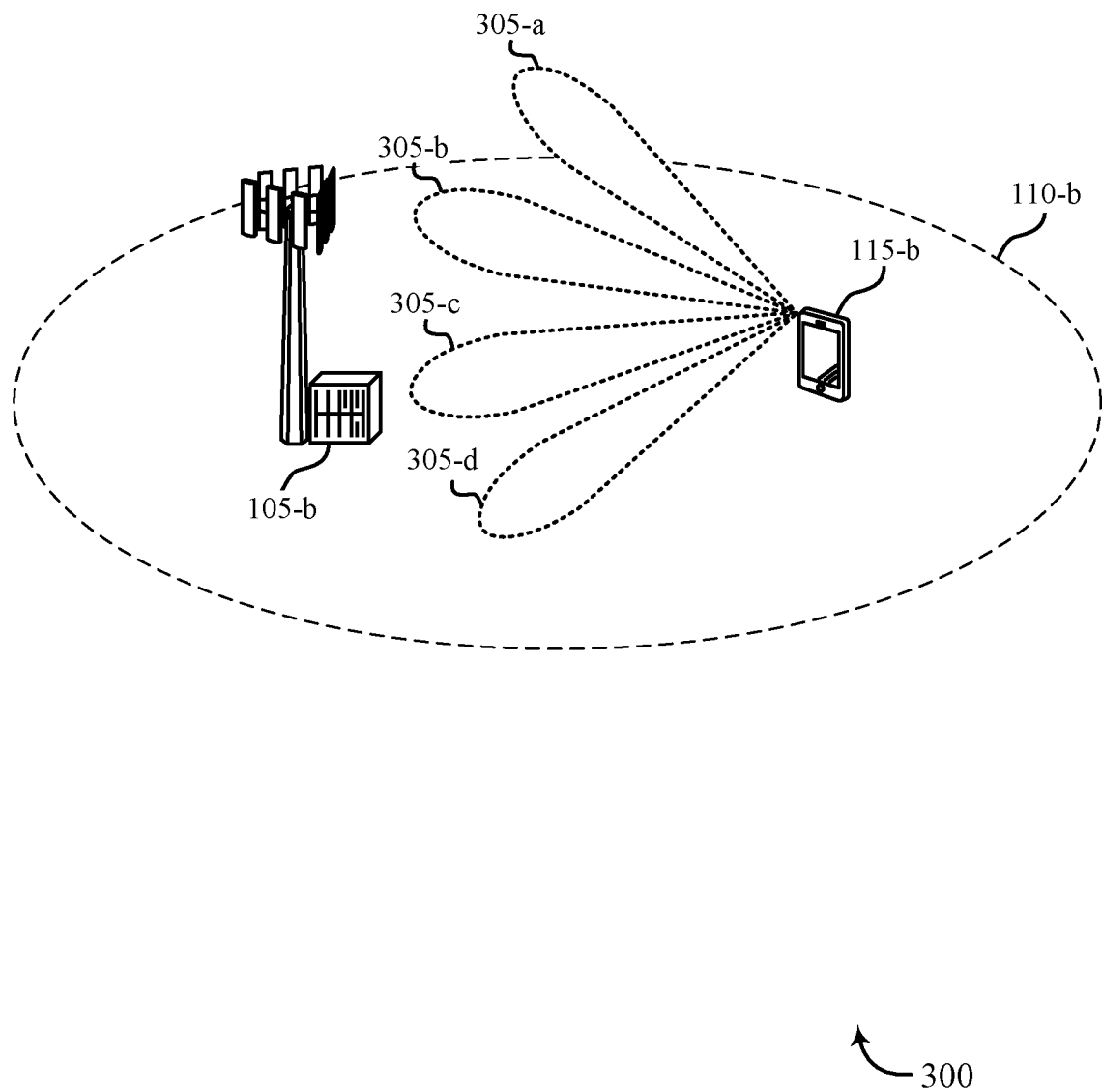
FIG. 3 illustrates an example of a wireless communication system that supports determining and indicating a range of beam correspondence, in accordance with various aspects of the present disclosure.

FIG. 3 illustrates an example of a wireless communication system 300 that supports determining and indicating a range of beam correspondence, in accordance with various aspects of the present disclosure. Wireless communication system 300 may be an example of one or more aspects of wireless communication system 100 or 200 of FIG. 1 or 2. Some examples of wireless communication system 300 may be a mmW wireless communication system. Wireless communication system 300 may include UE 115-*b* and base station 105-*b*, which may be one or more aspects of UEs 115 and base stations 105 as described with reference to FIGS. 1 and 2. The described techniques of wireless communication system 300 supports determining a range of beam correspondence between UE 115-*b* and base station 105-*b*.

UE 115-*b* of wireless communication system 300 may determine a level of beam correspondence (e.g., a range of beam correspondence) based on one or more signals transmitted between base station 105-*b* and UE 115-*b*. As described with reference to FIG. 2, the range of beam correspondence may include full correspondence, partial correspondence, or no correspondence. In some cases of wireless communication system 300, UE 115-*b* may perform beam training based on received signals from base station 105-*b*. In some examples, UE 115-*b* may receive one or more DL signals from base station 105-*b*. Base station 105-*b* may be a mmW base station that may transmit a beamformed transmission on an active beam to UE 115-*b*. In some cases, the transmissions from base station 105-*b* may be a beamformed or directional transmission directed towards UE 115-*b*.

In some examples of wireless communication system 300, beams 305-*a* through 305-*d* may be one or more aspects of beams 205-*a* through 205-*d* as described with reference to FIG. 2. In some cases, beams 305-*a* through 305-*d* may be one or more aspects of DL reception beams. UE 115-*b* may determine a DL reception beam based on a DL signal received from base station 105-*b*. UE 115-*b* may determine a level of beam correspondence based on the received DL transmission signal. In some cases, the received DL transmission signal may be associated with an individual DL transmission beam (e.g., DL transmission beams 205-*a* through 205-*d* as described with reference to FIG. 2). For example, UE 115-*b* may determine that at least one of beam 305-a, beam 305-b, beam 305-c, or beam 305-d may be a beam pair, i.e., DL reception beam for the DL transmission beam.

Alternatively, beams 305-a through 305-d may be one or more aspects of an UL transmission beam. For example, UE 115-b may transmit an UL signal via one or more UL transmission beams (e.g., UL transmission beams 305-a through 305-d) to base station 105-b. UE 115-b may transmit UL signals in a beamformed manner and sweep through an angular coverage region for a geographic coverage area 110-b. Each UL transmission beam 305-a through 305-d may be transmitted in a beam sweeping operation in different directions. For example, UL transmission beam 305-a may be transmitted in a first direction, UL transmission beam 305-b may be transmitted in a second direction, UL transmission beam 305-c may be transmitted in a third direction, and UL transmission beam 305-d may be transmitted in a fourth direction. Although wireless communication system 300 illustrates four UL transmission beams, i.e., UL transmission beams 305-a through 305-d, it is to be understood that fewer or more UL transmission beams may be transmitted.

The UL transmission beams 305 may alternatively be transmitted at different beam widths, at variable elevation angles, etc. In some cases, beams 305-a through 305-d may be associated with a beam index, e.g., an indicator identifying the UL transmission beam. Base station 105-b may, in some examples, identify an UL reception beam based on the beam index received and associated with the UL transmission beam (e.g., UL transmission beam 305-b).

In some examples, UE 115-b may transmit UL transmission beams during different symbol periods of a subframe. For example, UE 115-b may transmit a first UL transmission beam during a first symbol period (e.g., symbol 0), a second UL transmission beam during a second symbol period (e.g., symbol 1), etc. In some cases, UE 115-b may also transmit UL transmission beams during other symbol periods of a subframe. In some cases, base station 105-b may identify an UL reception beam based on the symbol period of the subframe associated with the received UL transmission beam. Base station 105-b may in some examples transmit a response (e.g., confirmation) signal to UE 115-b. Base station 105-b may include calibration values for calibrating a transmit path or receive path for UE 115-b. Calibration values may include a range of amplitude error of antenna weights, or a range of phase error compensating weight values, or a combination thereof as described with reference to FIG. 2.

Base station 105-b, in some examples, may determine an UL quality associated with an UL transmission beam from UE 115-a. In some examples, the UL quality may be based on a SNR or SINR of an UL beam pair. For example, an UL beam pair may include an UL transmit beam associated with UE 115-b and an UL reception beam associated with base station 105-b. Base station 105-b or UE 115-b may determine the SNR or SINR based on the UL transmit beam or UL receive beam. In some examples, base station 105-b or UE 115-b may determine a level of correspondence using the DL quality. Alternatively, base station 105-b or UE 115-b may determine the level of correspondence using the UL quality.

Base station 105-b may include an indication in the response signal to UE 115-b of an UL quality associated with the UL transmission beam. In some cases, UE 115-b may transmit an indication of the RSRP or RSRQ of a DL reception to base station 105-b. Base station 105-b may determine an UL quality associated with an UL transmission beam from UE 115-b. In some examples, the UL quality may be based on SNR or SINR of an UL beam pair. For example, an UL beam pair may include an UL transmit beam (e.g., UL transmission beam 305-a) associated with UE 115-b and an UL reception beam associated with base station 105-b (not shown). Base station 105-b or UE 115-b may determine the SNR or SINR based on the UL transmit beam or UL receive beam. In some examples, base station 105-b or UE 115-b may determine the level of correspondence using the UL quality.

In some examples, UE 115-b may transmit an indication identifying a level of correspondence to base station 105-b via a PBCH. In some cases, base station 105-b or UE 115-b may transmit an indication identifying a level of correspondence to each other via a RACH message. For example, base station 105-b or UE 115-b may transmit the indication via msg1-msg4 of the RACH. Alternatively, UE 115-b may transmit an indication identifying a level of correspondence to base station 105-b via a PUCCH. Base station 105-b or UE 115-b, in some cases, may transmit an indication identifying a level of correspondence to each other via a RRC message.

In some examples, UE 115-b may receive one or more DL signals on one or more DL transmission beams. The UE 115-b may identify a DL reception beam that satisfies a threshold, e.g., received signal strength threshold, channel/link quality threshold, etc. UE 115-b may identify a candidate DL reception beam based on a DL signal satisfying the threshold. As a result, UE 115-b may select a corresponding DL reception beam associated with the DL transmission beam.

Base station 105-b and UE 115-b may determine an amount of beam sweep based on the level of correspondence or a triggering event, or a combination thereof. A triggering event may include a UE 115-b transitioning to a connected mode from a DRX cycle. In some examples, UE 115-b may transition to a connected mode from a DRX cycle whose duration exceeds a threshold duration. The triggering event may also include a configuration change of a transmission sub-array or a reception sub-array. Additionally or alternatively, the triggering event may include a temperature change of UE 115-b. For example, a temperature of UE 115-b may exceed a predetermined threshold temperature. As a result, UE 115-b may modify a beam sweep range based on the temperature change. In some examples, the beam sweep range may be different for different links (e.g., DL or UL).

Figure 4A:
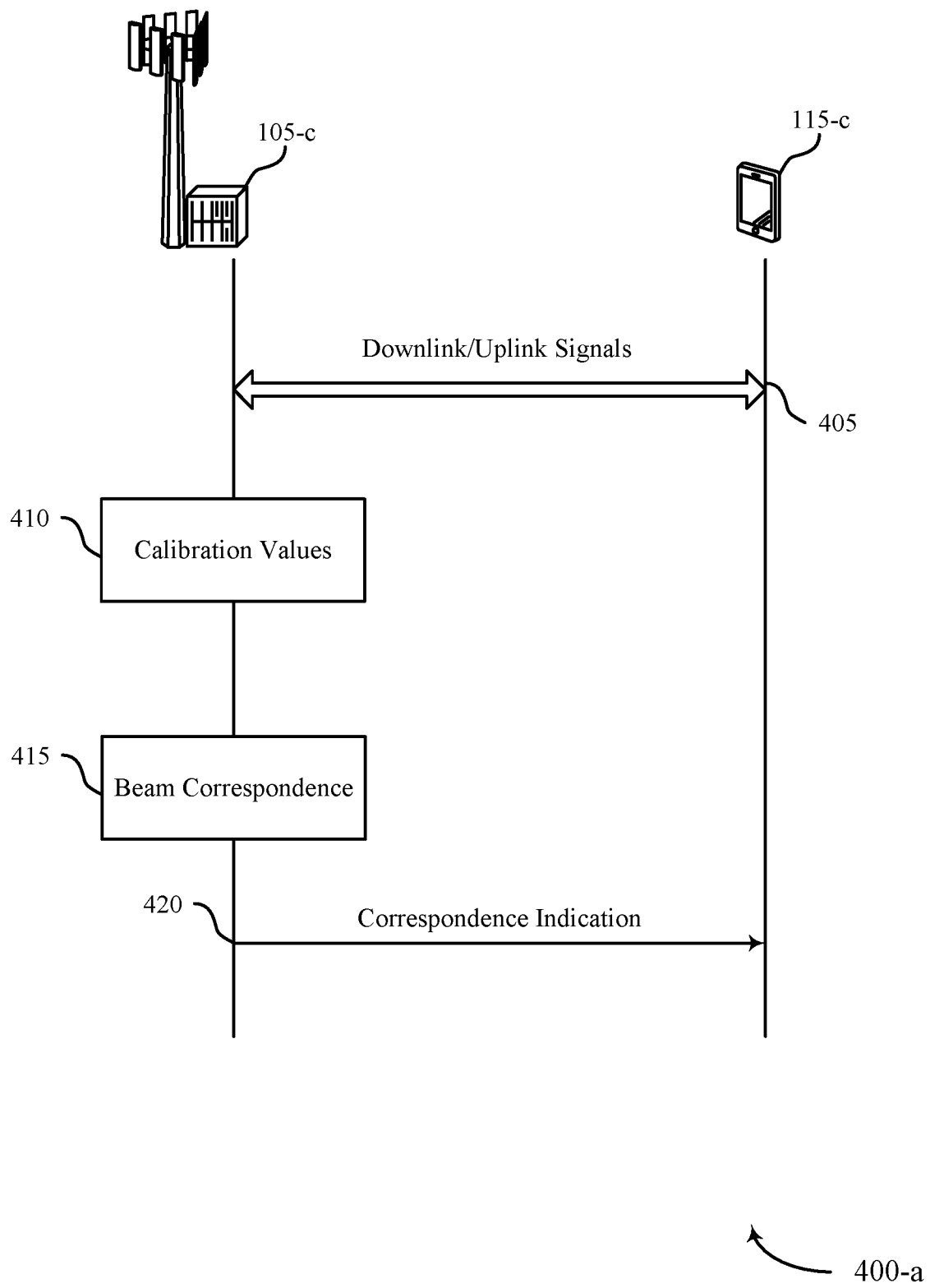
FIGS. 4A-4C illustrate examples of process flows that support determining and indicating a range of beam correspondence, in accordance with various aspects of the present disclosure.
Figure 4B:
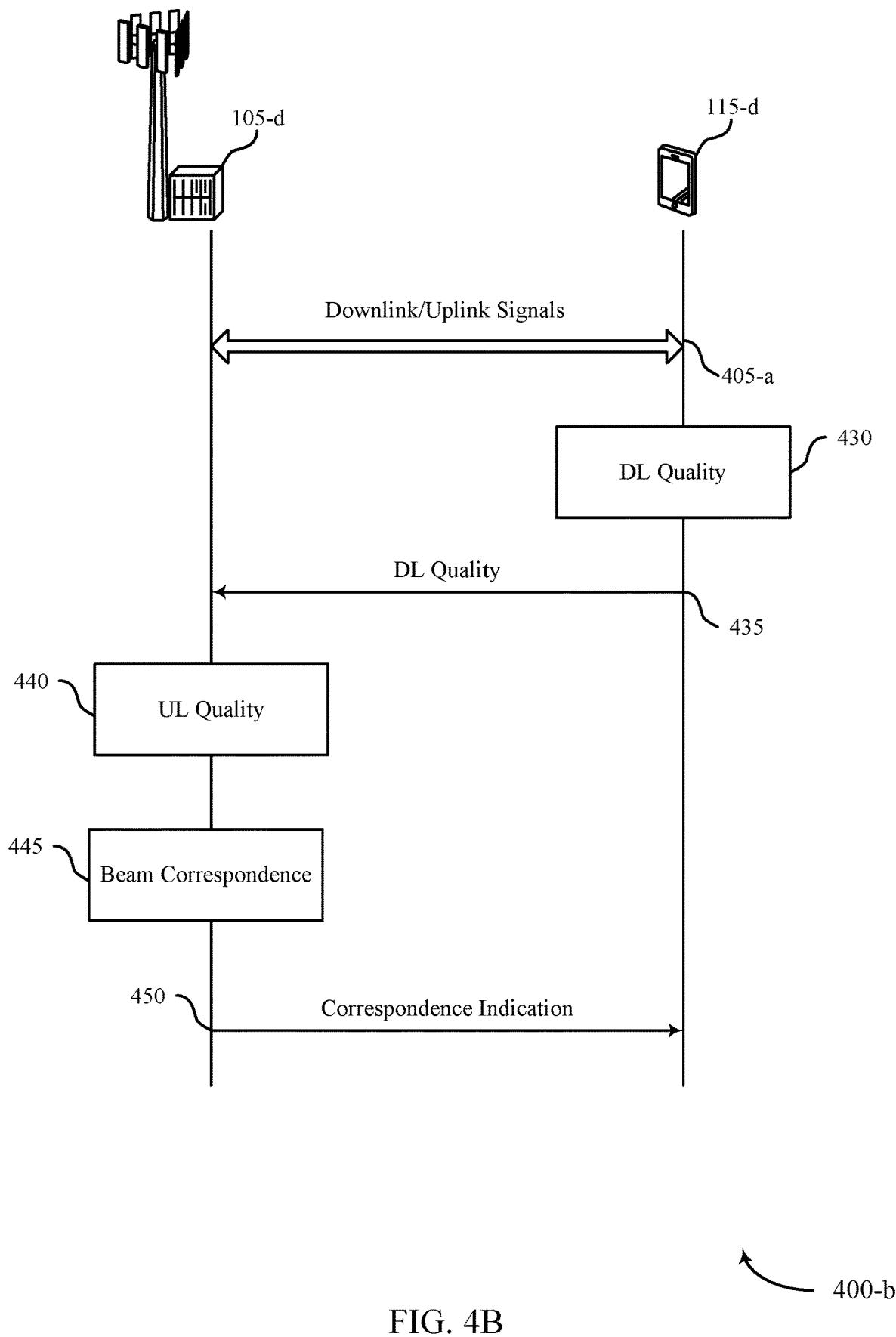
Figure 4C:
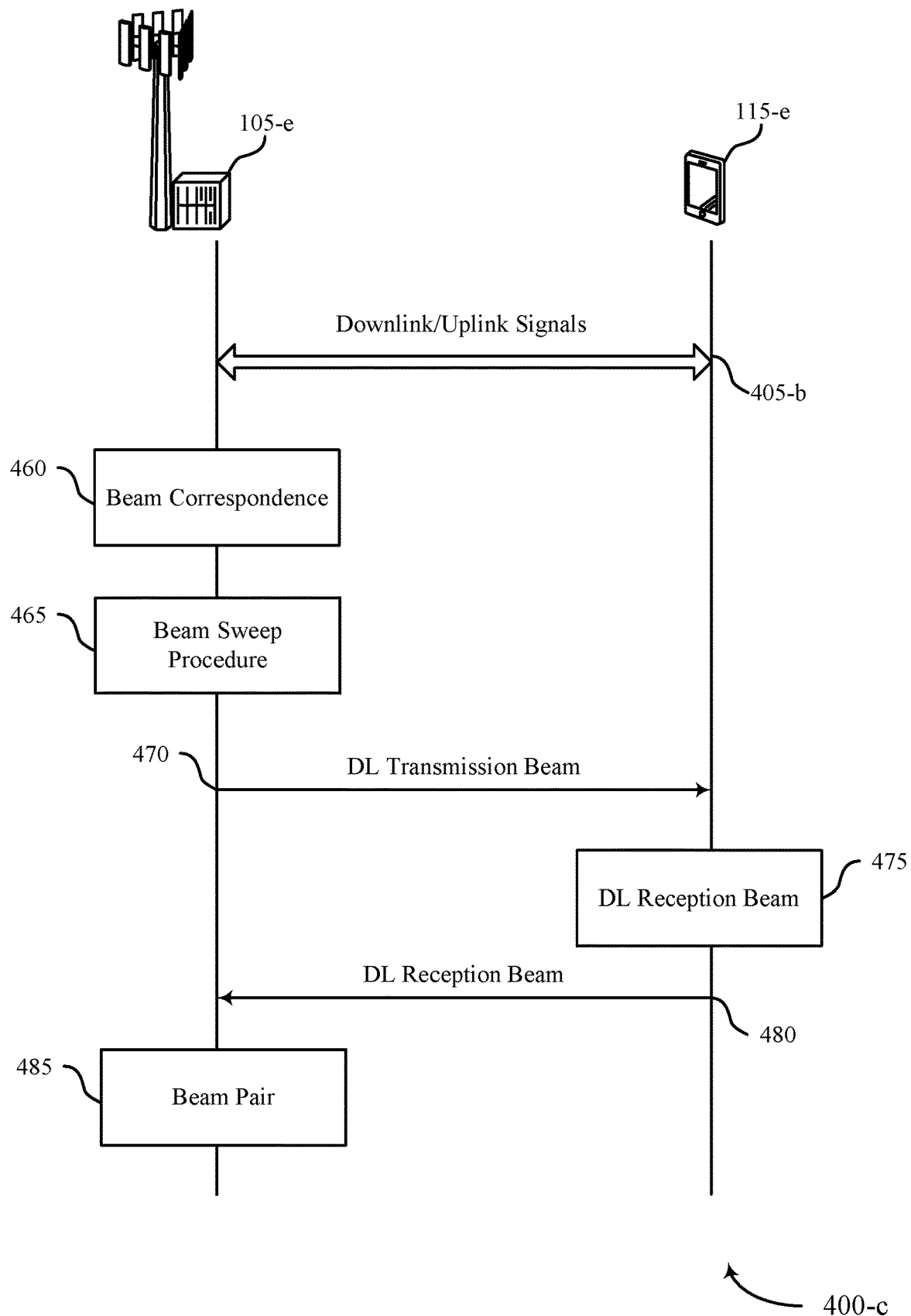

FIGS. 4A-4C illustrate examples of process flows 400 that support determining and indicating a range of beam correspondence, in accordance with various aspects of the present disclosure. Process flows 400 may implement aspects of wireless communication system 100, 200, or 300 as described with reference to FIGS. 1, 2, and 3. Process flows 400 may include base stations 105 and UEs 115, which may be examples of the corresponding devices of FIGS. 1-3. Base stations 105 may include a mmW base station and a service base station for UEs 115.

FIG. 4A illustrates an example of a process flow 400-a that illustrates one option for determining and indicating a range of beam correspondence, in accordance with various aspects of the present disclosure. Process flow 400-a may include base station 105-c and UE 115-c, which may be examples of the corresponding devices of FIGS. 1 through 3. Base station 105-c may be a mmW base station and a service base station for UE 115-c. At 405, base station 105-c and UE 115-c may exchange one or more signals between each other. In some cases, base station 105-c may transmit a DL signal via one or more DL beams. UE 115-c may receive the DL signal via one or more DL reception beams. Alternatively, UE 115-c may transmit an UL signal via one or more UL transmission beams and base station 105-c may receive the UL signal via one or more UL reception beams.

At 410, base station 105-c may receive calibration values from UE 115-c. In some examples, UE 115-c may transmit a signal indication to base station 105-c. The transmitted signal, via UE 115-c, may indicate a range of calibration values associated with a transmit path and a receive path of UE 115-c.

At 415, base station 105-c may determine a range of correspondence between at least a DL transmit beam of the base station 105-c and an UL receive beam of the base station 105-c. In some examples, base station 105-c may use the range of calibration values to determine the range of correspondence between the UL transmit beam of the UE 115-c and the DL receive beam of the UE 115-c. The range of correspondence may include full correspondence, partial correspondence, or no correspondence.

At 420, base station 105-c may transmit a correspondence indication to UE 115-c. In some cases, base station 105-c may include the correspondence range indication in a MIB (e.g., bits reserved for indicating correspondence) or a SIB (e.g., bits reserved for indicating correspondence) transmitted to UE 115-c. In some examples, the base station 105-c may transmit the MIB over a PBCH, and the base station 105-c may transmit the SIB over an ePBCH.

FIG. 4B illustrates an example of a process flow 400-b that illustrates another option that supports determining and indicating a range of beam correspondence, in accordance with various aspects of the present disclosure. Process flow 400-b may include base station 105-d and UE 115-d, which may be examples of the corresponding devices of FIGS. 1-3. Base station 105-d may be a mmW base station and a service base station for UE 115-d. At 405-a, base station 105-d and UE 115-d may exchange one or more signals between each other. In some cases, base station 105-d may transmit a DL signal via one or more DL beams. UE 115-d may receive the DL signal via one or more DL reception beams. Alternatively, UE 115-d may transmit an UL signal via one or more UL transmission beams and base station 105-d may receive the UL signal via one or more UL reception beams.

At 430, UE 115-d may determine a DL quality of a transmission on a DL beam pair associated with the transmitted signals 405-a that may include the DL transmit beam of base station 105-d and the DL receive beam of UE 115-d. In some examples, UE 115-d may determine the DL quality based on a RSRP, or a RSRQ, or a SNR, or a SINR, or a CQI, or a RSSI, or a combination thereof of the transmission on the DL beam pair.

At 435, UE 115-d may transmit a signal indicating the DL quality of the transmission on the DL beam pair to base station 105-d. In some examples, UE 115-d may transmit the signal on one or more UL transmission beams. At 440, base station 105-d may determine an UL quality of a transmission on an UL beam pair that may include the UL transmit beam of UE 115-d and an UL receive beam of base station 105-d. In some examples, base station 105-d may determine the UL quality based on determining a SNR, or a SINR, or a CQI, or a RSSI, or a combination thereof of the transmission on the uplink beam pair.

At 445, base station 105-d may use the DL quality or the UL quality to determine a range of correspondence between a transmit beam of UE 115-d and the receive beam of the UE 115-d. The range of correspondence may include full correspondence, partial correspondence, or no correspondence.

Base station 105-d may, at 450, transmit a correspondence indication to UE 115-d. In some cases, base station 105-d may include the correspondence range indication in a MIB (e.g., bits reserved for indicating correspondence) or a SIB (e.g., bits reserved for indicating correspondence) transmitted to UE 115-d. In some examples, the base station 105-d may transmit the MIB over a PBCH, and the base station 105-d may transmit the SIB over an ePBCH.

FIG. 4C illustrates an example of a process flow 400-c that supports determining and indicating a range of beam correspondence, in accordance with various aspects of the present disclosure. Process flow 400-c may include base station 105-e and UE 115-e, which may be examples of the corresponding devices of FIGS. 1-3. Base station 105-e may be a mmW base station and a service base station for UE 115-e.

At 405-b, base station 105-e and UE 115-e may exchange one or more signals between each other. In some cases, base station 105-e may transmit a DL signal via one or more DL beams. UE 115-e may receive the DL signal via one or more DL reception beams. Alternatively, UE 115-e may transmit an UL signal via one or more UL transmission beams and base station 105-e may receive the UL signal via one or more UL reception beams.

At 460, base station 105-e may determine a range of correspondence between at least a DL transmit beam of the base station 105-e and a DL receive beam of the base station 105-e. The range of correspondence may include full correspondence, partial correspondence, or no correspondence. In some examples, if at least partial beam correspondence between base station 105-e and UE 115-e exists, base station 105-e or UE 115-e may avoid performing a beam sweep to identify a beam pair (i.e., transmission beam and reception beam). However, in some examples, the range of beam correspondence may be below a threshold and base station 105-e or UE 115-e may perform at least a partial beam sweep (e.g., of a plurality of beams, a subset of the plurality of beams, etc.) to identify a beam pair (i.e., a transmission/reception beam).

At 465, base station 105-e may perform a beam sweep procedure. A beam sweep procedure may include base station 105-e transmitting one or more DL signals via one or more DL beams to UE 115-e. For example, at 470 base station 105-e may transmit a DL signal via a DL transmission beam. At 475, UE 115-e may identify a DL reception beam. In some examples, UE 115-e may identify the DL reception beam based on determining a SNR, or a SINR, or a CQI, or a RSSI, or a combination thereof of the DL transmission beam associated with one or more DL reception beams of UE 115-e. At 480, UE 115-e may transmit an indication of DL reception beam to base station 105-e. At 485, base station 105-e may identify a DL beam pair based on the received indication of the DL reception beam from UE 115-e.

Figure 5:
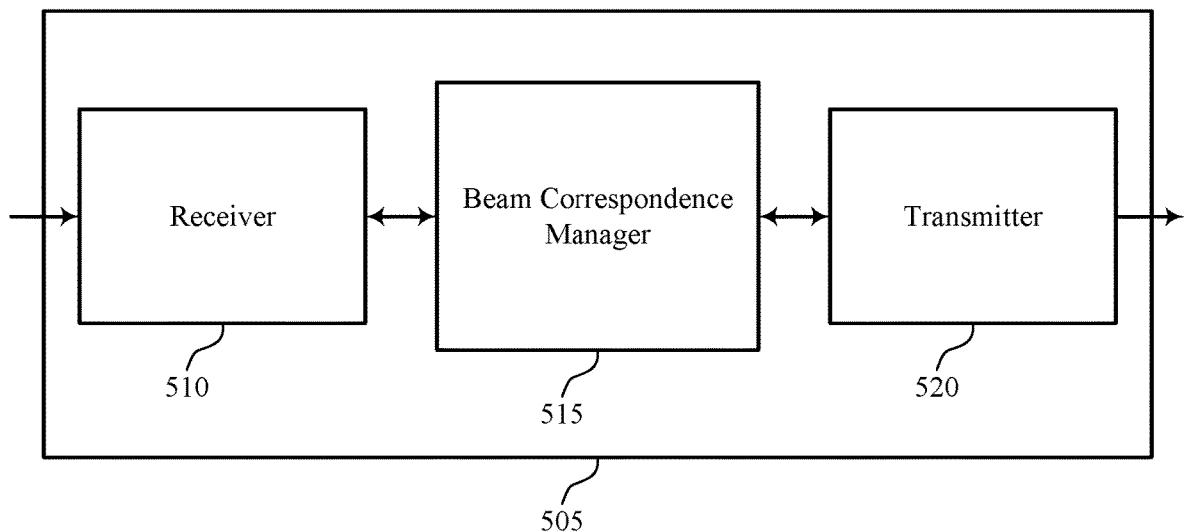
FIG. 5 illustrates a block diagram of a wireless device configured for use in wireless communication that supports determining and indicating a range of beam correspondence, in accordance with various aspects of the present disclosure.

FIG. 5 illustrates a block diagram 500 of a wireless device 505 configured for use in wireless communication that supports determining and indicating a range of beam correspondence, in accordance with various aspects of the present disclosure. Wireless device 505 may be an example of aspects of a UE 115 or base station 105 as described with reference to FIGS. 1-4. Wireless device 505 may include receiver 510, beam correspondence manager 515, and transmitter 520. Wireless device 505 may also include a processor. Each of these components may be in communication with one another (e.g., via one or more buses).

Receiver 510 may receive information such as packets, user data, or control information associated with various information channels (e.g., DL-UL beam correspondence, control channels, data channels, and information related to indicating a range of beam correspondence in a wireless node, etc.). Information may be passed on to other components of the device.

Beam correspondence manager 515 may exchange one or more signals between a first wireless node and a second wireless node and determine, at the first wireless node and based on the one or more signals, a range of correspondence between at least one of a transmit beam of the first wireless node and a receive beam of the first wireless node, or a transmit beam of the second wireless node and a receive beam of the second wireless node.

Transmitter 520 may transmit signals generated by other components of the device. In some examples, the transmitter 520 may be collocated with a receiver 510 in a transceiver module. The transmitter 520 may include a single antenna, or it may include a set of antennas.

Figure 6:
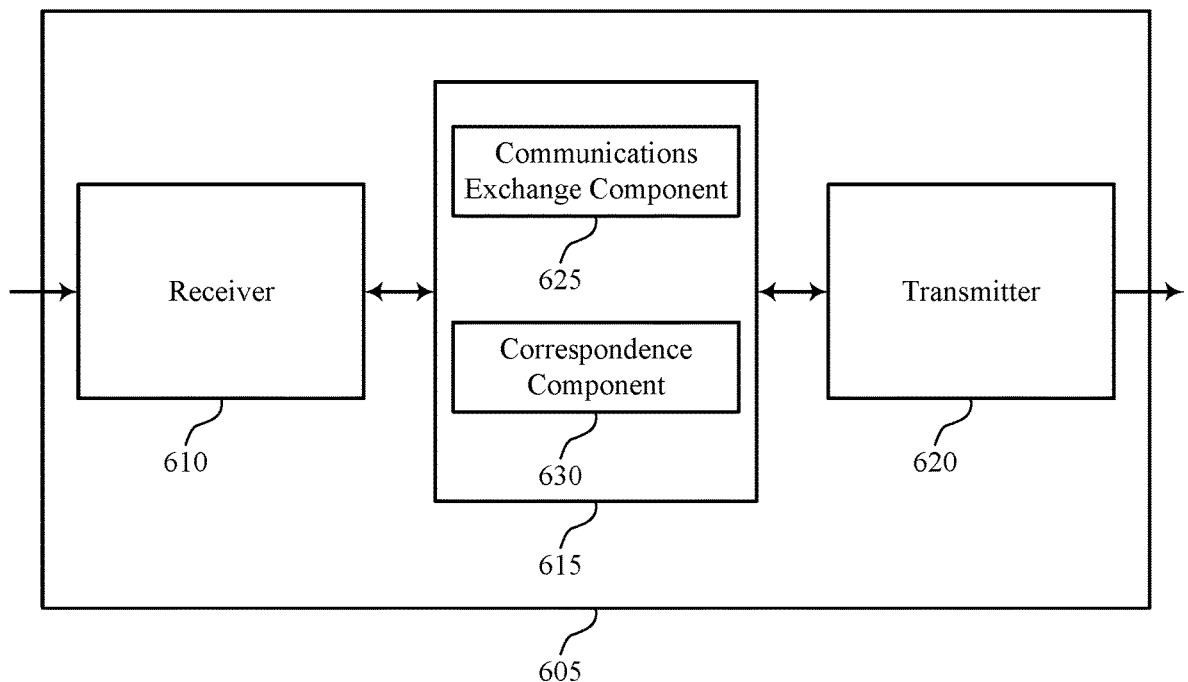
FIG. 6 illustrates a block diagram of a wireless device configured for use in wireless communication that supports determining and indicating a range of beam correspondence, in accordance with various aspects of the present disclosure.

FIG. 6 illustrates a block diagram 600 of a wireless device 605 configured for use in wireless communication that supports determining and indicating a range of beam correspondence, in accordance with various aspects of the present disclosure. Wireless device 605 may be an example of aspects of a wireless device 505 or UE 115 or base station 105 as described with reference to FIGS. 1-5. Wireless device 605 may include receiver 610, beam correspondence manager 615, and transmitter 620. Wireless device 605 may also include a processor. Each of these components may be in communication with one another (e.g., via one or more buses).

Receiver 610 may receive information such as packets, user data, or control information associated with various information channels (e.g., UL-DL beam correspondence information, control channels, data channels, and information related to indicating a range of beam correspondence in a wireless node, etc.). Information may be passed on to other components of the device. The receiver 610 may be an example of aspects of the receiver 510 described with reference to FIG. 5.

Beam correspondence manager 615 may be an example of aspects of the beam correspondence manager 515 described with reference to FIG. 5. Beam correspondence manager 615 may include communications exchange component 625 and correspondence component 630. Communications exchange component 625 may exchange one or more signals between a first wireless node and a second wireless node, receive, from the second wireless node, a signal indicating a DL quality of a transmission on a DL beam pair that includes the transmit beam of the first wireless node and the receive beam of the second wireless node, and receive, from the second wireless node, an indication of the range of correspondence between the transmit beam of the second wireless node and the receive beam of the second wireless node. In some cases, beam correspondence manager 615 may apply a similar beam shape for a transmit beam and a receive beam. The similar beam shape indicates that the transmit beam and the receive beam use a same set of antenna elements, or beam widths, or point to a same direction, or a combination thereof.

In some cases, receiving the indication of the range of correspondence between the transmit beam of the second wireless node and the receive beam of the second wireless node includes receiving the indication via at least one of a PBCH, an ePBCH, a RACH message, a PDCCH, a PUCCH, a RRC message, a MIB, or a SIB.

Correspondence component 630 may determine, at the first wireless node and based on the one or more signals, a range of correspondence between at least one of a transmit beam of the first wireless node and a receive beam of the first wireless node, or a transmit beam of the second wireless node and a receive beam of the second wireless node, and receive, from the second wireless node, a signal indicating a range of calibration values associated with a transmit path and a receive path of the second wireless node.

In some cases, correspondence component 630 may use the range of calibration values to determine the range of correspondence between the transmit beam of the second wireless node and the receive beam of the second wireless node. In some cases, the range of calibration values includes at least one of a range of amplitude error of antenna weights, a range of phase error of the antenna weights, or combinations thereof. In some cases, the range of calibration values includes at least a difference between amplitude error of antenna weights associated with the transmit path and the receive path, a difference between phase error of antenna weights associated with the transmit path and the receive path, or combinations thereof.

In some cases, correspondence component 630 may use the DL quality and the UL quality to determine the range of correspondence between the transmit beam of the second wireless node and the receive beam of the second wireless node. In some cases, correspondence component 630 may determine the range of correspondence based on determining a difference between at least one of the transmit beam of the first wireless node and the receive beam of the first wireless node, or the receive beam of the second wireless node and the transmit beam of the second wireless node.

Transmitter 620 may transmit signals generated by other components of the device. In some examples, the transmitter 620 may be collocated with receiver 610 in a transceiver module. For example, the transmitter 620 may be an example of aspects of transmitter 520 described with reference to FIG. 5. The transmitter 620 may include a single antenna, or it may include a set of antennas.

Figure 7:
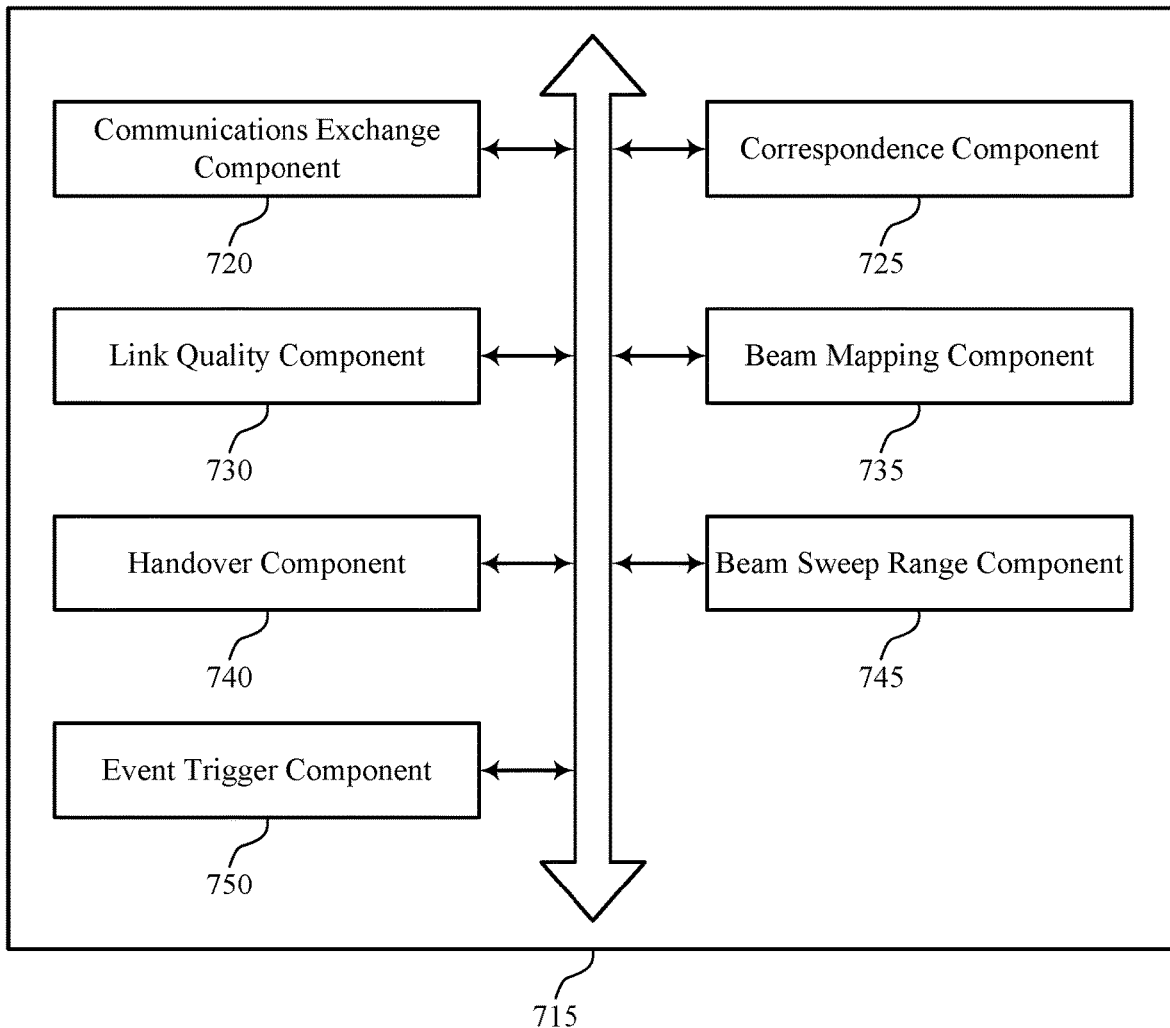
FIG. 7 illustrates a block diagram of a wireless communication system that supports determining and indicating a range of beam correspondence, in accordance with various aspects of the present disclosure.

FIG. 7 illustrates a block diagram 700 that supports determining and indicating a range of beam correspondence, in accordance with various aspects of the present disclosure. The beam correspondence manager 715 may be an example of aspects of beam correspondence manager 515 or beam correspondence manager 615, described with reference to FIGS. 5 and 6. The beam correspondence manager 715 may include communications exchange component 720, correspondence component 725, link quality component 730, beam mapping component 735, handover component 740, beam sweep range component 745, and event trigger component 750. Each of these modules may communicate, directly or indirectly, with one another (e.g., via one or more buses).

Communications exchange component 720 may exchange one or more signals between a first wireless node and a second wireless node, receive, from the second wireless node, a signal indicating a DL quality of a transmission on a DL beam pair that includes the transmit beam of the first wireless node and a receive beam of the second wireless node, and receive, from the second wireless node, an indication of the range of correspondence between the transmit beam of the second wireless node and the receive beam of the second wireless node. In some cases, receiving the signal indicating the DL quality includes receiving an indication of at least one of a RSRP, RSRQ, SNR, SINR, CQI, RSSI, or a combination thereof of the transmission on the downlink beam pair. In some cases, receiving the indication of the range of correspondence between the transmit beam of the second wireless node and the receive beam of the second wireless node includes receiving the indication via at least one of a PBCH, an ePBCH, a RACH message, a PDCCH, a PUCCH, a RRC message, a MIB, or a SIB.

Correspondence component 725 may determine, at the first wireless node and based on the one or more signals, a range of correspondence between at least one of a transmit beam of the first wireless node and a receive beam of the first wireless node, or a transmit beam of the second wireless node and a receive beam of the second wireless node, and receive, from the second wireless node, a signal indicating a range of calibration values associated with a transmit path and a receive path of the second wireless node. In some cases, the range of correspondence includes full correspondence, partial correspondence, or no correspondence.

In some cases, correspondence component 725 may use the range of calibration values to determine the range of correspondence between a transmit beam of the second wireless node and a receive beam of the second wireless node. In some cases, the range of calibration values includes at least one of a range of amplitude error of antenna weights, a range of phase error of antenna weights, or combinations thereof. In some cases, the range of calibration values includes at least a difference between amplitude error of antenna weights associated with the transmit path and the receive path, a difference between phase error of antenna weights associated with the transmit path and the receive path, or combinations thereof.

In some cases, correspondence component 725 may use the DL quality and the UL quality to determine the range of correspondence between the transmit beam of the second wireless node and the receive beam of the second wireless node. In some cases, determining the range of correspondence includes determining a difference between indices of the transmit beam of the first wireless node and the receive beam of the first wireless node, or a difference between indices of at least one of a receive beam of the second wireless node and a transmit beam of the second wireless node. In some cases, the transmit beam of the first wireless node is associated with a higher quality than other transmit beams of the first wireless node and the receive beam of the first wireless node is associated with a higher quality than other receive beams of the first wireless node.

Link quality component 730 may determine, at the first wireless node, an UL quality of a transmission on an UL beam pair that includes the transmit beam of the second wireless node and the receive beam of the first wireless node. In some cases, determining the UL quality includes determining at least one of a RSRP, or a RSRQ, or an SNR, or an SINR, or a CQI, or an RSSI, or a combination thereof of the transmission on the UL beam pair. In some cases, the first wireless node and the second wireless node may apply a similar beam shape for the transmit beam and the receive beam. In some cases, the similar beam shape indicates that the transmit beam and the receive beam use a same set of antenna elements, or beam widths, or point to a same direction, or a combination thereof.

Beam mapping component 735 may determine an uncertainty region for beam mapping based on the determined difference. In some cases, the range of correspondence corresponds to a breadth of the uncertainty region. Handover component 740 may perform a handover procedure. In some cases, receiving the indication of the range of correspondence between the transmit beam of the second wireless node and the receive beam of the second wireless node includes receiving the indication as part of the handover procedure. In some cases, the handover procedure is either a backward handover procedure or a forward handover procedure.

Beam sweep range component 745 may determine a range of a beam sweep to be performed based on the range of correspondence and on a triggering event. In some cases, a range of a beam sweep to be performed for each of multiple simultaneous communication links is different. Event trigger component 750 may identify an event trigger. In some cases, the triggering event includes awaking in connected mode from a DRX cycle whose duration exceeds a threshold. In some cases, the triggering event includes a changing of a transmission or reception subarray. Additionally or alternatively, the triggering event may include identifying that a temperature of either the first wireless node or the second wireless node has changed in excess of a threshold.

Figure 8:
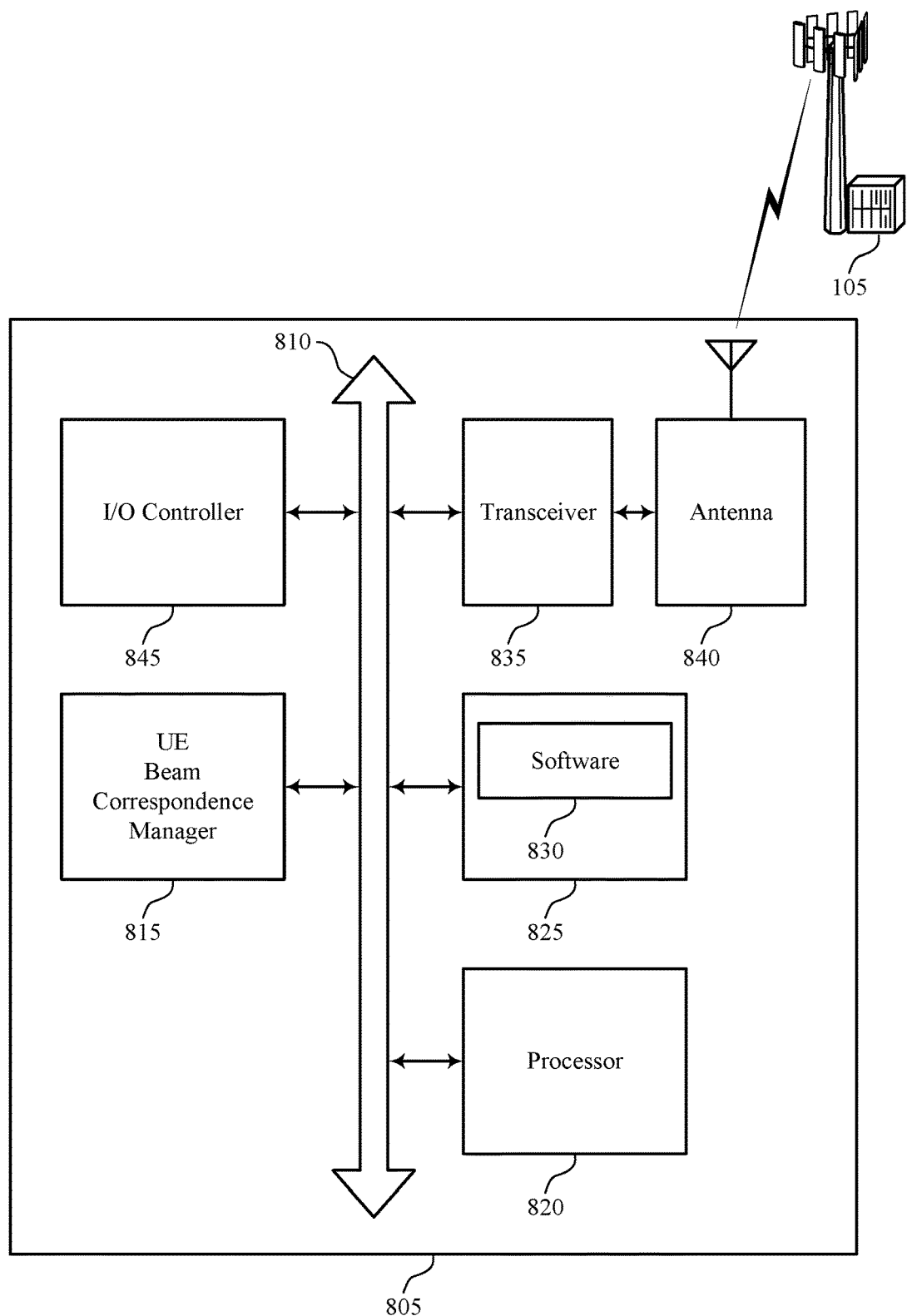
FIG. 8 illustrates a block diagram of an apparatus for use in wireless communication that supports determining and indicating a range of beam correspondence, in accordance with various aspects of the present disclosure.

FIG. 8 illustrates a block diagram 800 of an apparatus 805 for use in wireless communication that supports determining and indicating a range of beam correspondence, in accordance with various aspects of the present disclosure. Apparatus 805 may be an example of or include the components of wireless device 505, wireless device 605, or a UE 115 as described above, e.g., with reference to FIGS. 1, 5 and 6. Apparatus 805 may include components for bi-directional voice and data communication including components for transmitting and receiving communication, including UE beam correspondence manager 815, processor 820, memory 825, software 830, transceiver 835, antenna 840, and I/O controller 845. These components may be in electronic communication via one or more busses (e.g., bus 810). Apparatus 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting indicating a range of beam correspondence in a wireless node).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support indicating a range of beam correspondence in a wireless node. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions. I/O controller 845 may manage input and output signals for apparatus 805. I/O controller 845 may also manage peripherals not integrated into apparatus 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
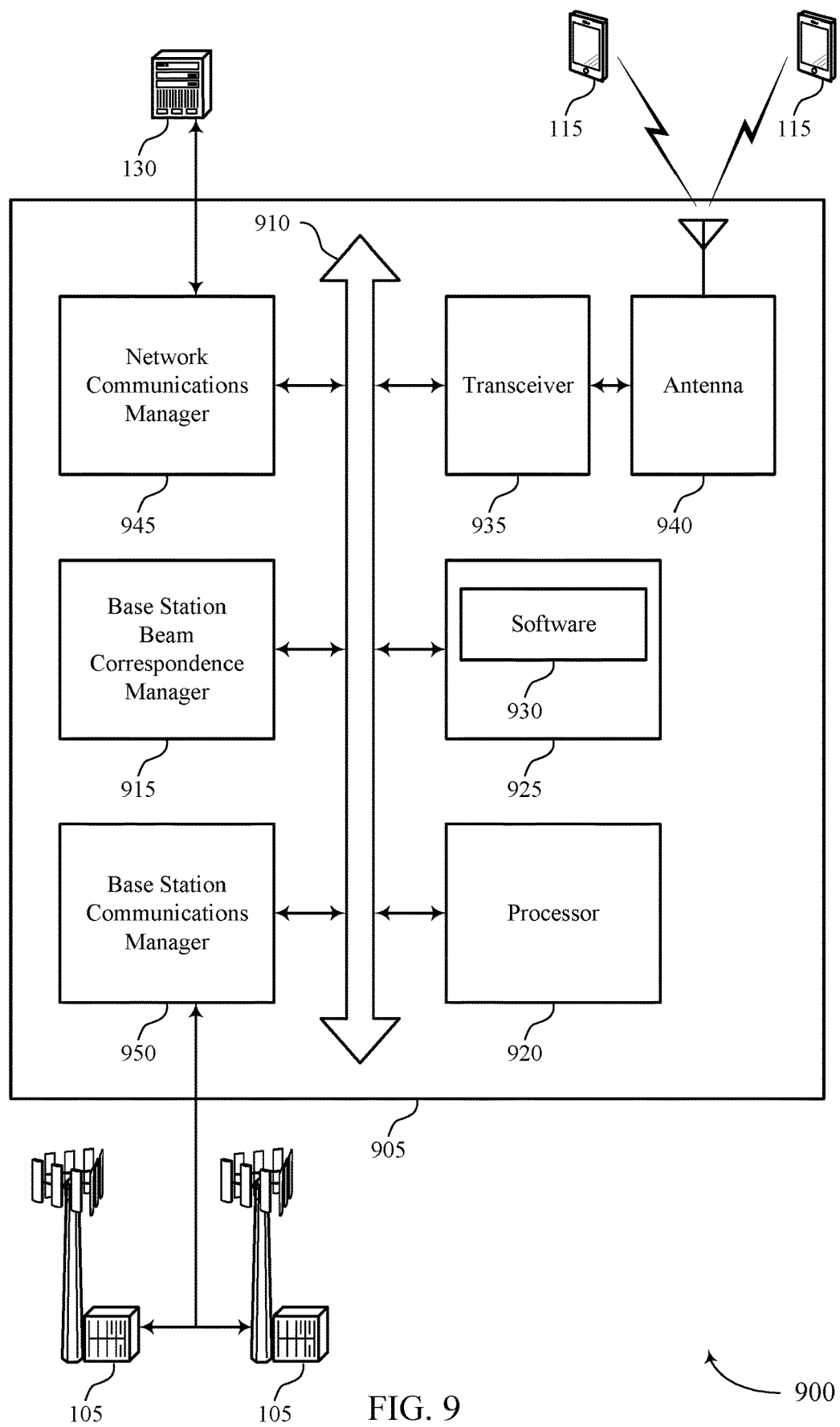
FIG. 9 illustrates a block diagram of an apparatus for use in wireless communication that supports determining and indicating a range of beam correspondence, in accordance with various aspects of the present disclosure.

FIG. 9 illustrates a block diagram 900 of an apparatus 905 for use in wireless communication that supports determining and indicating a range of beam correspondence, in accordance with various aspects of the present disclosure. Apparatus 905 may be an example of or include the components of wireless device 505, wireless device 605, or a base station 105 as described above, e.g., with reference to FIGS. 1, 5, and 6. Apparatus 905 may include components for bi-directional voice and data communication including components for transmitting and receiving communication, including base station beam correspondence manager 915, processor 920, memory 925, software 930, transceiver 935, antenna 940, network communications manager 945, and base station communications manager 950. These components may be in electronic communication via one or more busses (e.g., bus 910). Apparatus 905 may communicate wirelessly with one or more UEs 115 and base stations 105.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting indicating a range of beam correspondence in a wireless node).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support indicating a range of beam correspondence in a wireless node. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases, the device may have more than one antenna 940, which may be capable of concurrently transmitting or receiving multiple wireless transmissions. Network communications manager 945 may manage communication with the core network (e.g., via one or more wired backhaul links). For example, the network communications manager 945 may manage the transfer of data communications for client devices, such as one or more UEs 115.

Base station communications manager 950 may manage communication with other base stations 105, and may include a controller or scheduler for controlling communication with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
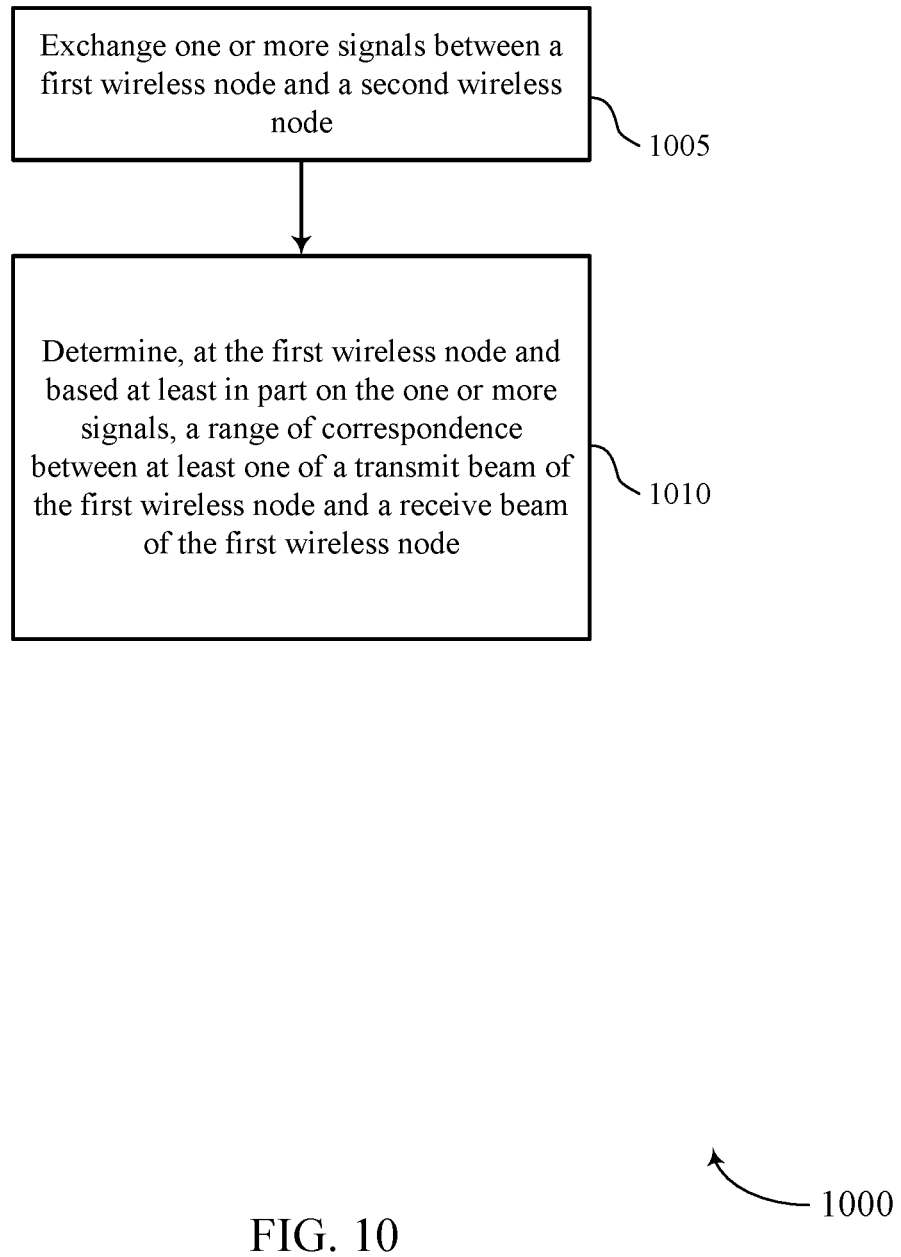
FIGS. 10 through 14 illustrate methods that support determining and indicating a range of beam correspondence, in accordance with various aspects of the present disclosure.

FIG. 10 illustrates a method 1000 that supports determining and indicating a range of beam correspondence, in accordance with various aspects of the present disclosure. The operations of method 1000 may be implemented by a UE 115 or base station 105 or its components as described herein. For example, the operations of method 1000 may be performed by a beam correspondence manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005, UE 115 or base station 105 may exchange one or more signals between a first wireless node and a second wireless node. In certain examples, aspects of the operations of block 1005 may be performed by a communications exchange component as described with reference to FIGS. 6 and 7.

At block 1010, UE 115 or base station 105 may determine, at the first wireless node (i.e., UE 115 or base station 105) and based at least in part on the one or more signals, a range of correspondence between at least one of a transmit beam of the first wireless node and a receive beam of the first wireless node. Additionally or alternatively, in some cases, UE 115 or base station 105 may determine a range of correspondence between transmit beam of the second wireless node (i.e., UE 115 or base station 105) and a receive beam of the second wireless node. In certain examples, aspects of the operations of block 1010 may be performed by a correspondence component as described with reference to FIGS. 6 and 7.

Figure 11:
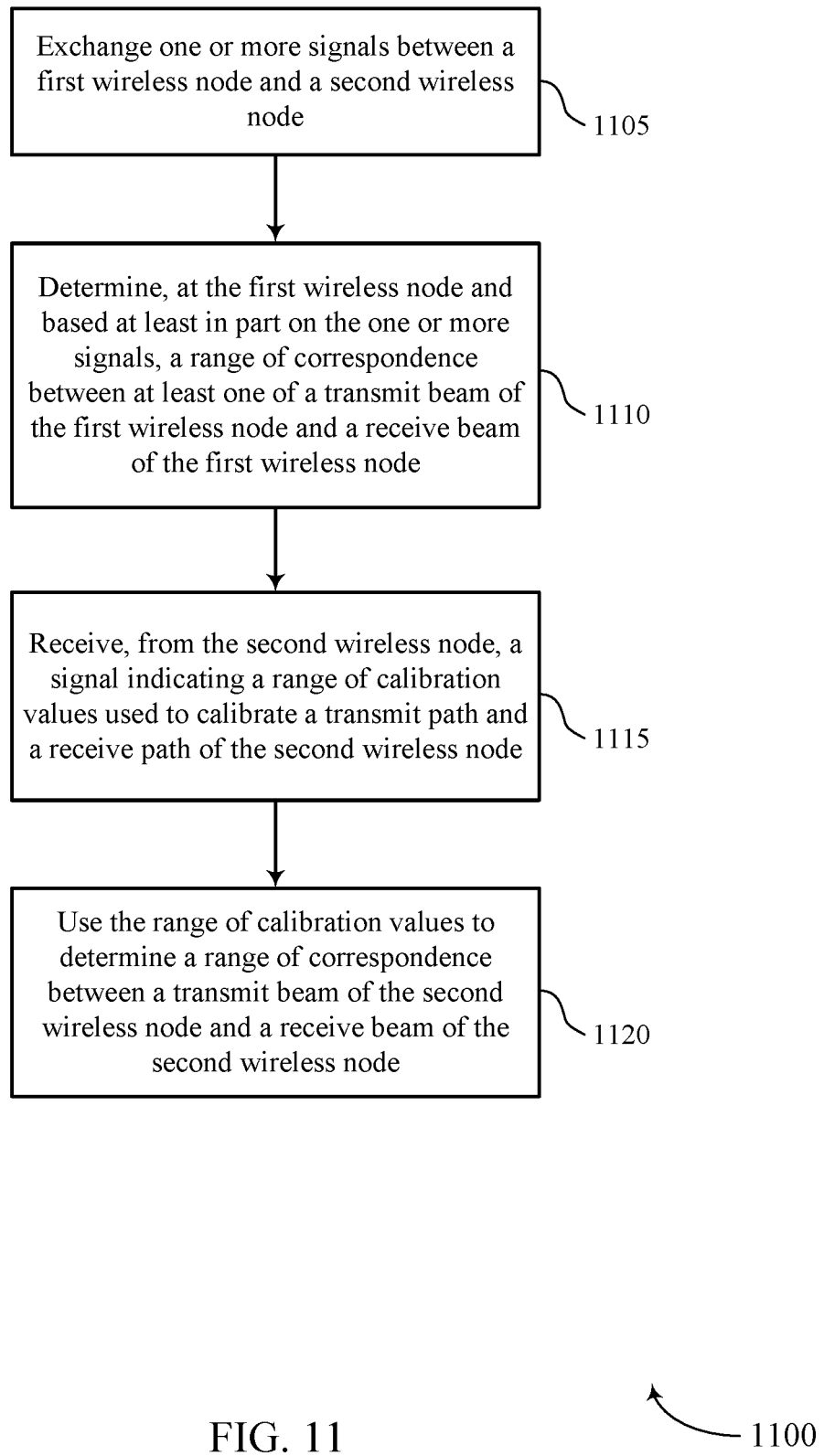

FIG. 11 illustrates a method 1100 that supports determining and indicating a range of beam correspondence, in accordance with various aspects of the present disclosure. The operations of method 1100 may be implemented by a UE 115 or base station 105 or its components as described herein. For example, the operations of method 1100 may be performed by a beam correspondence manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105, UE 115 or base station 105 may exchange one or more signals between a first wireless node and a second wireless node. The operations of block 1105 may be performed according to the methods described with reference to FIG. 10. In certain examples, aspects of the operations of block 1105 may be performed by a communications exchange component as described with reference to FIGS. 6 and 7.

At block 1110, UE 115 or base station 105 may determine, at the first wireless node (i.e., UE 115 or base station 105) and based at least in part on the one or more signals, a range of correspondence between at least one of a transmit beam of the first wireless node and a receive beam of the first wireless node. The operations of block 1110 may be performed according to the methods described with reference to FIG. 10. In certain examples, aspects of the operations of block 1110 may be performed by a correspondence component as described with reference to FIGS. 6 and 7.

At block 1115, UE 115 or base station 105 may receive, from the second wireless node (i.e., UE 115 or base station 105), a signal indicating a range of calibration values associated with a transmit path and a receive path of the second wireless node. In certain examples, aspects of the operations of block 1115 may be performed by a correspondence component as described with reference to FIGS. 6 and 7.

At block 1120, UE 115 or base station 105 may use the range of calibration values to determine a range of correspondence between a transmit beam of the second wireless node and a receive beam of the second wireless node. In certain examples, aspects of the operations of block 1120 may be performed by a correspondence component as described with reference to FIGS. 6 and 7.

Figure 12:
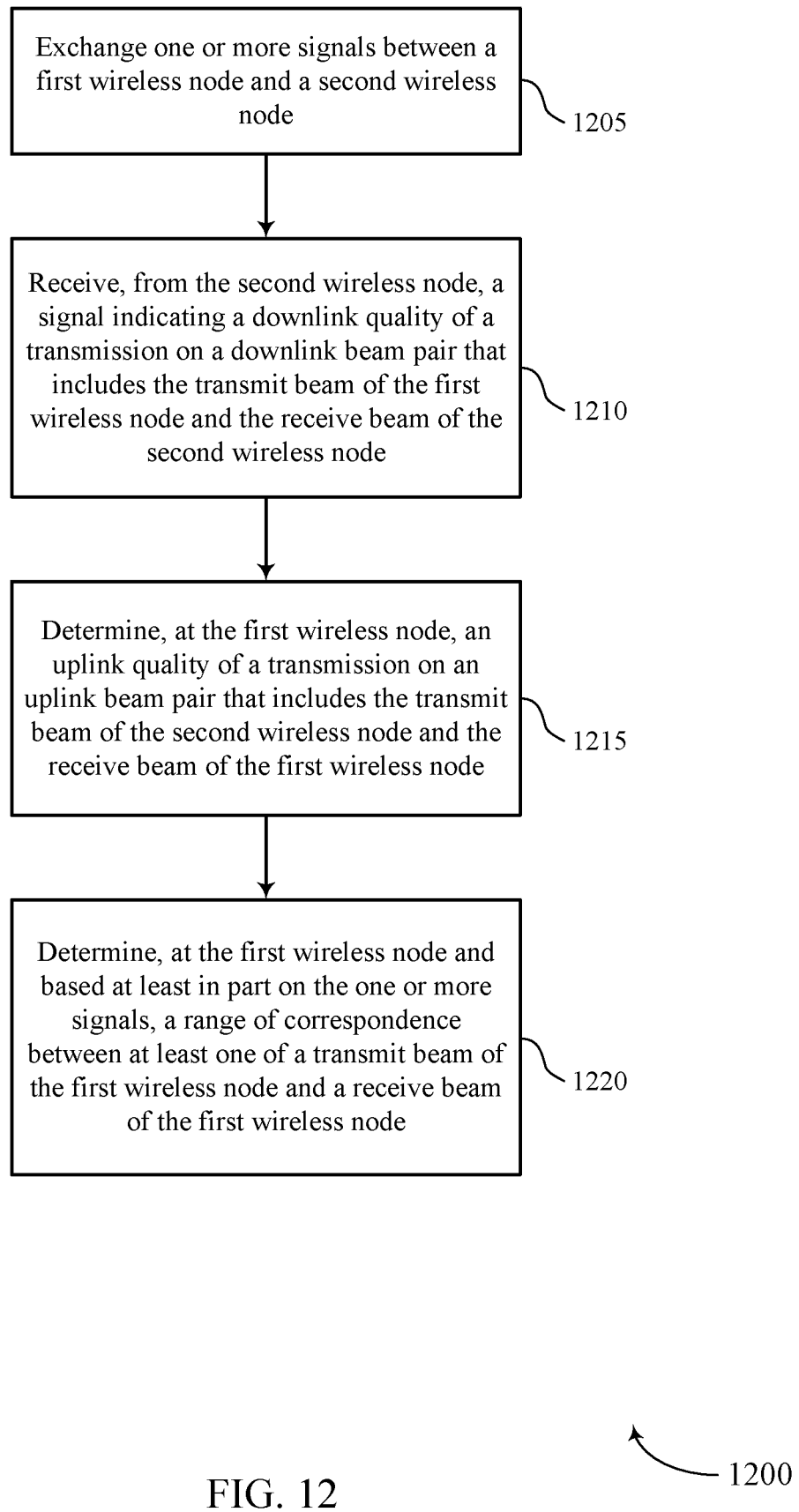

FIG. 12 illustrates a method 1200 that supports determining and indicating a range of beam correspondence, in accordance with various aspects of the present disclosure. The operations of method 1200 may be implemented by a UE 115 or base station 105 or its components as described herein. For example, the operations of method 1200 may be performed by a beam correspondence manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205, UE 115 or base station 105 may exchange one or more signals between a first wireless node and a second wireless node. The operations of block 1205 may be performed according to the methods described with reference to FIGS. 10 and 11. In certain examples, aspects of the operations of block 1205 may be performed by a communications exchange component as described with reference to FIGS. 6 and 7.

At block 1210, UE 115 or base station 105 may receive, from the second wireless node, a signal indicating a DL quality of a transmission on a DL beam pair that includes the transmit beam of the first wireless node (i.e., UE 115 or base station 105) and the receive beam of the second wireless node (i.e., UE 115 or base station 105). In certain examples, aspects of the operations of block 1210 may be performed by a communications exchange component as described with reference to FIGS. 6 and 7.

At block 1215, UE 115 or base station 105 may determine, at the first wireless node, an UL quality of a transmission on an UL beam pair that includes the transmit beam of the second wireless node (i.e., UE 115 or base station 105) and the receive beam of the first wireless node (i.e., UE 115 or base station 105). In certain examples, aspects of the operations of block 1215 may be performed by a link quality component as described with reference to FIG. 7.

At block 1220, UE 115 or base station 105 may determine, at the first wireless node (i.e., UE 115 or base station 105) and based at least in part on the one or more signals, a range of correspondence between at least one of a transmit beam of the first wireless node and a receive beam of the first wireless node. In some examples, UE 115 or base station 105 may use the DL quality or the UL quality to determine the range of correspondence between the transmit beam of the second wireless node and the receive beam of the second wireless node. In certain examples, aspects of the operations of block 1220 may be performed by a correspondence component as described with reference to FIGS. 6 and 7.

Figure 13:
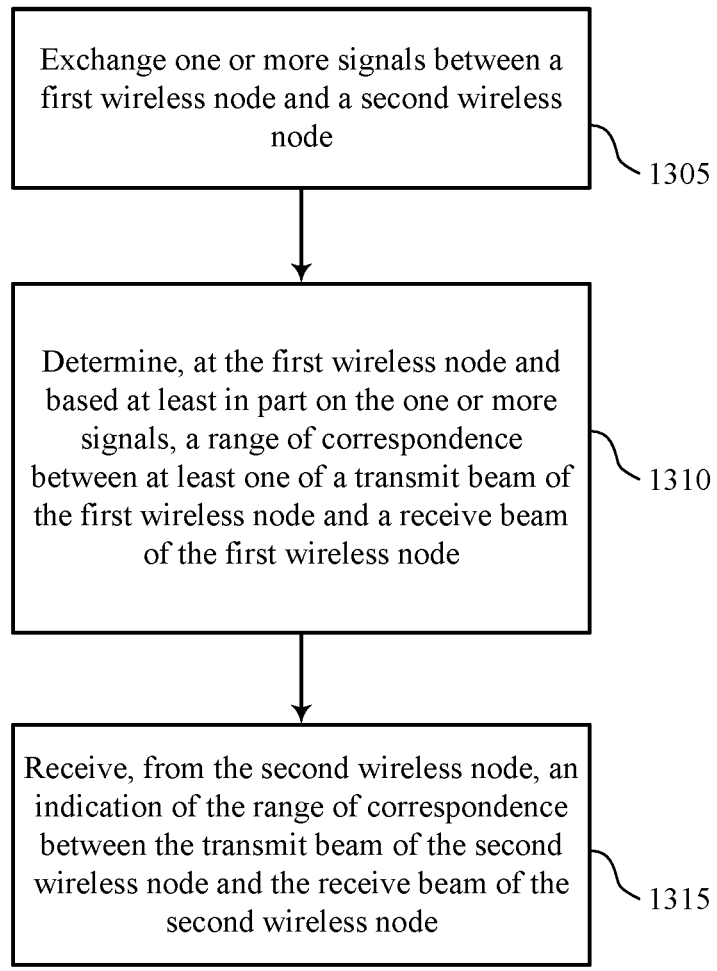

FIG. 13 illustrates a method 1300 that supports determining and indicating a range of beam correspondence, in accordance with various aspects of the present disclosure. The operations of method 1300 may be implemented by a UE 115 or base station 105 or its components as described herein. For example, the operations of method 1300 may be performed by a beam correspondence manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305, UE 115 or base station 105 may exchange one or more signals between a first wireless node and a second wireless node. The operations of block 1305 may be performed according to the methods described with reference to FIGS. 10 through 12. In certain examples, aspects of the operations of block 1305 may be performed by a communications exchange component as described with reference to FIGS. 6 and 7.

At block 1310, UE 115 or base station 105 may determine, at the first wireless node (i.e., UE 115 or base station 105) and based at least in part on the one or more signals, a range of correspondence between at least one of a transmit beam of the first wireless node and a receive beam of the first wireless node. Additionally or alternatively, UE 115 or base station 105 may determine a range of correspondence between a transmit beam of the second wireless node (i.e., UE 115 or base station 105) and a receive beam of the second wireless node. The operations of block 1310 may be performed according to the methods described with reference to FIGS. 10 through 12. In certain examples, aspects of the operations of block 1310 may be performed by a correspondence component as described with reference to FIGS. 6 and 7.

At block 1315, UE 115 or base station 105 may receive, from the second wireless node (i.e., UE 115 or base station 105), an indication of the range of correspondence between the transmit beam of the second wireless node and the receive beam of the second wireless node. In certain examples, aspects of the operations of block 1315 may be performed by a communications exchange component as described with reference to FIGS. 6 and 7.

Figure 14:
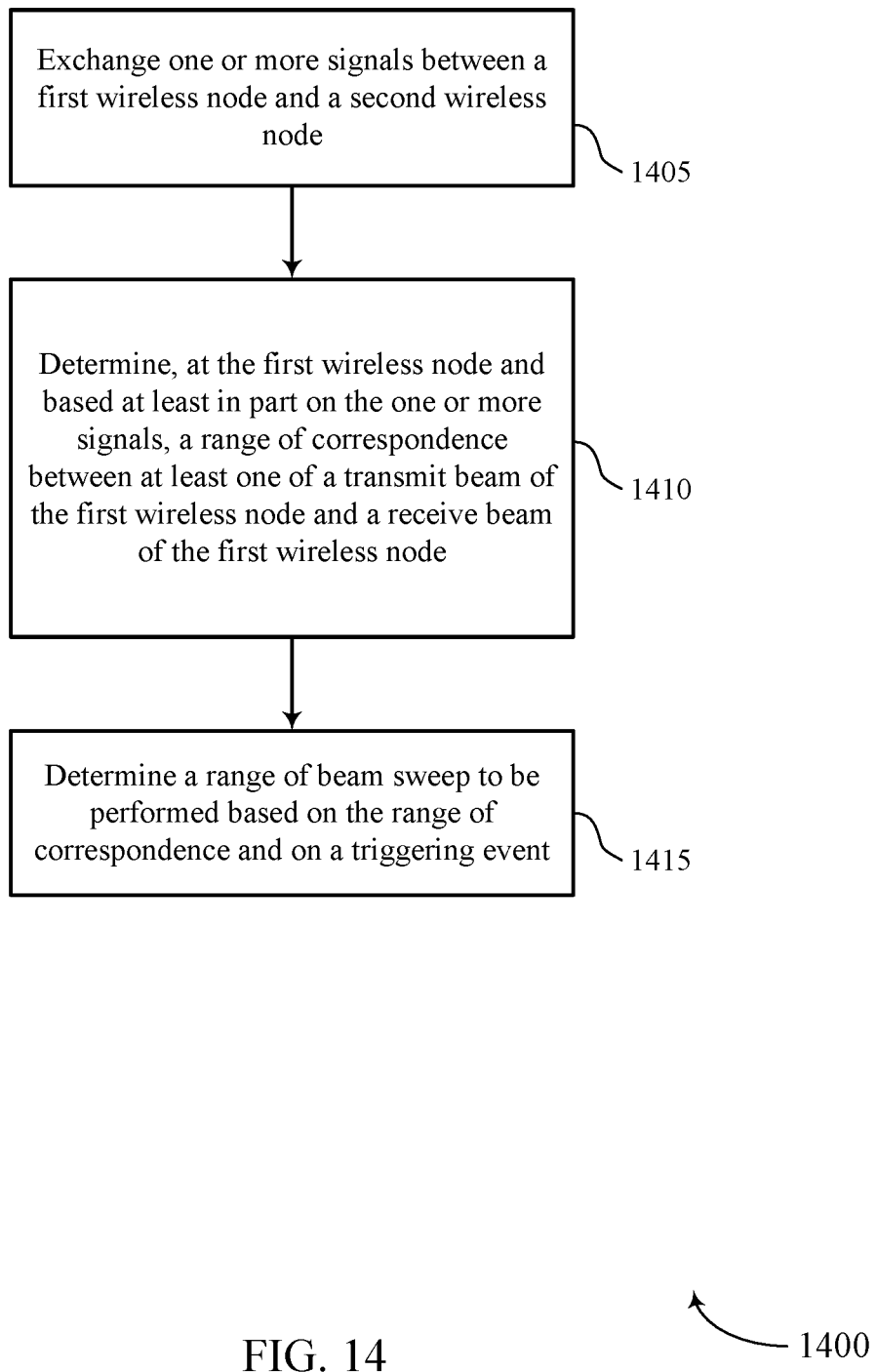

FIG. 14 illustrates a method 1400 that supports determining and indicating a range of beam correspondence, in accordance with various aspects of the present disclosure. The operations of method 1400 may be implemented by a UE 115 or base station 105 or its components as described herein. For example, the operations of method 1400 may be performed by a beam correspondence manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405, UE 115 or base station 105 may exchange one or more signals between a first wireless node and a second wireless node. The operations of block 1405 may be performed according to the methods described with reference to FIGS. 10 through 13. In certain examples, aspects of the operations of block 1405 may be performed by a communications exchange component as described with reference to FIGS. 6 and 7.

At block 1410, UE 115 or base station 105 may determine, at the first wireless node (i.e., UE 115 or base station 105) and based at least in part on the one or more signals, a range of correspondence between at least one of a transmit beam of the first wireless node and a receive beam of the first wireless node. Additionally or alternatively, UE 115 or base station 105 may determine a range of correspondence between a transmit beam of the second wireless node (i.e., UE 115 or base station 105) and a receive beam of the second wireless node. The operations of block 1410 may be performed according to the methods described with reference to FIGS. 10 through 13. In certain examples, aspects of the operations of block 1410 may be performed by a correspondence component as described with reference to FIG. 7.

At block 1415, UE 115 or base station 105 may determine a range of a beam sweep to be performed based at least in part on the range of correspondence and on a triggering event. In certain examples, aspects of the operations of block 1415 may be performed by a beam sweep range component as described with reference to FIG. 7.

In some examples, aspects from two or more of the methods 1000, 1100, 1200, 1300, or 1400 may be combined. It should be noted that the methods 1000, 1100, 1200, 1300, or 1400 are just example implementations, and that the operations of the methods 1000, 1100, 1200, 1300, or 1400 may be rearranged or otherwise modified such that other implementations are possible.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label. Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
exchanging one or more signals between a first wireless node and a second wireless node;
determining, at the first wireless node and based at least in part on the one or more signals, a level of correspondence between at least one of a transmit beam of the first wireless node and a receive beam of the first wireless node, wherein determining the level of correspondence comprises determining whether a difference exists between indices of the transmit beam of the first wireless node and the receive beam of the first wireless node; and
determining a range of a beam sweep to be performed based at least in part on the level of correspondence and on a triggering event.

2. The method of claim 1, wherein the level of correspondence comprises full correspondence, partial correspondence, or no correspondence.

3. The method of claim 1, further comprising:
determining a level of correspondence between a transmit beam of the second wireless node and a receive beam of the second wireless node.

4. The method of claim 1, wherein exchanging one or more signals between the first wireless node and the second wireless node comprises:
receiving, from the second wireless node, a signal indicating a range of calibration values associated with a transmit path and a receive path of the second wireless node.

5. The method of claim 4, further comprising:
using the range of calibration values to determine a level of correspondence between a transmit beam of the second wireless node and a receive beam of the second wireless node.

6. The method of claim 4, wherein the range of calibration values includes at least one of a range of amplitude error of antenna weights, a range of phase error of antenna weights, or combinations thereof.

7. The method of claim 4, wherein the range of calibration values includes at least a difference between amplitude error of antenna weights associated with the transmit path and the receive path, a difference between phase error of antenna weights associated with the transmit path and the receive path, or combinations thereof.

8. The method of claim 1, wherein exchanging one or more signals between the first wireless node and the second wireless node comprises:
receiving, from the second wireless node, a signal indicating a downlink quality of a transmission on a downlink beam pair that includes the transmit beam of the first wireless node and a receive beam of the second wireless node; and
determining, at the first wireless node, an uplink quality of a transmission on an uplink beam pair that includes a transmit beam of the second wireless node and the receive beam of the first wireless node.

9. The method of claim 8, wherein the first wireless node and the second wireless node apply a similar beam shape for the transmit beam and the receive beam.

10. The method of claim 9, wherein the similar beam shape indicates that the transmit beam and the receive beam use a same set of antenna elements, or beam widths, or point to a same direction, or a combination thereof.

11. The method of claim 8, further comprising:
using the downlink quality and the uplink quality to determine the level of correspondence between the transmit beam of the second wireless node and the receive beam of the second wireless node.

12. The method of claim 8, wherein receiving the signal indicating the downlink quality comprises:
receiving an indication of at least one of a reference signal received power (RSRP), or a reference signal received quality (RSRQ), or a signal-to-noise ratio (SNR), or a signal-to-interference-plus-noise ratio (SINR), or a channel quality indicator (CQI), or a received signal strength indicator (RSSI), or a combination thereof of the transmission on the downlink beam pair.

13. The method of claim 8, wherein determining the uplink quality comprises:
determining at least one of a reference signal received power (RSRP), or a reference signal received quality (RSRQ), or a signal-to-noise ratio (SNR), or a signal-to-interference-plus-noise ratio (SINR), or a channel quality indicator (CQI) or a received signal strength indicator (RSSI), or a combination thereof of the transmission on the uplink beam pair.

14. The method of claim 1, wherein the transmit beam of the first wireless node is associated with a higher quality than other transmit beams of the first wireless node and the receive beam of the first wireless node is associated with a higher quality than other receive beams of the first wireless node.

15. The method of claim 14, wherein determining the level of correspondence comprises:
determining the difference between the indices of the transmit beam of the first wireless node and the receive beam of the first wireless node; and
determining an uncertainty region for beam mapping based on the determined difference.

16. The method of claim 15, wherein the level of correspondence corresponds to a breadth of the uncertainty region.

17. The method of claim 15, further comprising:
determining a difference between indices of a receive beam of the second wireless node and a transmit beam of the second wireless node.

18. The method of claim 1, wherein exchanging one or more signals comprises:
receiving, from the second wireless node, an indication of a level of correspondence between a transmit beam of the second wireless node and a receive beam of the second wireless node.

19. The method of claim 18, wherein receiving the indication of the level of correspondence between the transmit beam of the second wireless node and the receive beam of the second wireless node comprises:
receiving the indication in a physical broadcast channel (PBCH), an extended physical broadcast channel (ePBCH), a random access channel (RACH) message, a physical downlink control channel (PDCCH), a physical uplink control channel (PUCCH), a physical uplink shared channel (PUSCH), a radio resource control (RRC) message, a master information block (MIB), or a system information block (SIB).

20. The method of claim 18, wherein receiving the indication of the level of correspondence between the transmit beam of the second wireless node and the receive beam of the second wireless node comprises:
receiving the indication as part of a handover procedure.

21. The method of claim 1, wherein the triggering event comprises awaking in connected mode from a discontinuous reception (DRX) cycle whose duration exceeds a threshold.

22. The method of claim 1, wherein the triggering event comprises a changing of a transmission or reception subarray.

23. The method of claim 1, wherein a range of a beam sweep to be performed for each of multiple simultaneous communication links is different.

24. An apparatus for wireless communication, in a system comprising:
a processor;
a memory in electronic communication with the processor; and
instructions stored in the memory and operable, when executed by the processor, to cause the apparatus to:
exchange one or more signals between a first wireless node and a second wireless node; and
determine, at the first wireless node and based at least in part on the one or more signals, a level of correspondence between at least one of a transmit beam of the first wireless node and a receive beam of the first wireless node, wherein the instructions to determine the level of correspondence are executable by the processor to cause the apparatus to determine whether a difference exists between indices of the transmit beam of the first wireless node and the receive beam of the first wireless node; and
determining a range of a beam sweep to be performed based at least in part on the level of correspondence and on a triggering event.

25. The apparatus of claim 24, wherein the level of correspondence comprises full correspondence, partial correspondence, or no correspondence.

26. The apparatus of claim 24, wherein the instructions are further executable by the processor to:
determine a level of correspondence between a transmit beam of the second wireless node and a receive beam of the second wireless node.

27. The apparatus of claim 24, wherein the instructions are further executable by the processor to:
receive, from the second wireless node, a signal indicating a range of calibration values associated with a transmit path and a receive path of the second wireless node.

28. An apparatus for wireless communication, comprising:
means for exchanging one or more signals between a first wireless node and a second wireless node; and
means for determining, at the first wireless node and based at least in part on the one or more signals, a level of correspondence between at least one of a transmit beam of the first wireless node and a receive beam of the first wireless node, wherein the means for determining the level of correspondence comprises means for determining whether a difference exists between indices of the transmit beam of the first wireless node and the receive beam of the first wireless node; and
determining a range of a beam sweep to be performed based at least in part on the level of correspondence and on a triggering event.

29. A non-transitory computer readable medium storing code for wireless communication, the code comprising instructions executable by a processor to:
exchange one or more signals between a first wireless node and a second wireless node; and
determine, at the first wireless node and based at least in part on the one or more signals, a level of correspondence between at least one of a transmit beam of the first wireless node and a receive beam of the first wireless node, wherein the instructions to determine the level of correspondence are executable to determine whether a difference exists between indices of the transmit beam of the first wireless node and the receive beam of the first wireless node; and
determining a range of a beam sweep to be performed based at least in part on the level of correspondence and on a triggering event.

* * * * *